United States Patent [19]

Serra et al.

[11] Patent Number: 4,646,240
[45] Date of Patent: Feb. 24, 1987

[54] METHOD AND APPARATUS FOR DETERMINING GEOLOGICAL FACIES

[76] Inventors: Oberto Serra, STS, 11th Floor Pub Building, Somerset Road, Singapore, Singapore, 0923; Hayden Abbott, 805 Holland Road, Singapore, Singapore, 1027; Yves Kerbart, 46 Rue des Champs Elysees, 94250 Gentilly; Philippe Vincent, 9 Place Alexandre 1ER de Yougoslavie, 78000 Versailles, both of France

[21] Appl. No.: 851,302

[22] Filed: Apr. 7, 1986

Related U.S. Application Data

[63] Continuation of Ser. No. 768,171, Aug. 22, 1985, abandoned, which is a continuation of Ser. No. 462,586, Jan. 31, 1983, abandoned.

[30] Foreign Application Priority Data

Feb. 2, 1982 [FR] France .................. 82 01658

[51] Int. Cl.⁴ .................. G01V 1/30; G01V 11/00
[52] U.S. Cl. .................. 364/422; 324/323
[58] Field of Search .............. 364/421, 422; 324/323; 367/86

[56] References Cited

U.S. PATENT DOCUMENTS

| | | | |
|---|---|---|---|
| 4,283,953 | 8/1981 | Plona | 367/86 X |
| 4,320,458 | 3/1982 | Vincent | 364/422 |
| 4,495,604 | 1/1985 | Dumanoir | 364/422 X |

FOREIGN PATENT DOCUMENTS

2060882  7/1981  United Kingdom .............. 340/860

OTHER PUBLICATIONS

Serra, O. et al., "Sedimentological Analysis of Shale--Sand Series from Well Logs", SPWLA Sixteenth Annual Logging Symposium, Jun. 1975, 1-23.

Serra, O. et al., "The Contribution of Logging Data to Sedimentology and Stratigraphy", 55th Annual Fall Technical Conference of SPE, Sep. 1980, 1-19.

Goetz, J. F. et al., "Reservoir Delineation by Wireline Techniques", Sixth Annual Convention of the Indonesian Petroleum Association, May 1977, 1-40.

Primary Examiner—Jerry Smith
Assistant Examiner—Clark A. Jablon
Attorney, Agent, or Firm—Cox & Smith Incorporated

[57] ABSTRACT

In a method and apparatus for obtaining a recording of facies of geological formations, logging instruments are moved in a borehole to produce log measurements at successive levels of the borehole. With each level is associated a reference sample whose coordinates are constituted by the respective measurements in a multidimensional space defined by the different logs. The scatter of samples thus obtained is analyzed to distinguish modes characteristic of clusters in which the concentration of samples is the highest. The samples may then be associated with selected modes to form classes each characteristic of a respective facie, and the facies then displayed as a function of the depth of the respective associated sample.

24 Claims, 20 Drawing Figures

| LOG TYPE | MNEMONIC | COMPARATIVE IMPORTANCE OF GEOLOGICAL PARAMETERS | | | |
|---|---|---|---|---|---|
| RESISTIVITY | (R) | [ MINERALOGY | TEXTURE | STRUCTURE | FLUID ] |
| SPONTANEOUS POTENTIAL | (SP) | [ MINERALOGY | TEXTURE | STRUCTURE | FLUID ] |
| ELECTROMAGNETIC WAVE PROPAGATION TIME | (EPT°) | [ MINERALOGY | TEXTURE | STRUCTURE | FLUID ] |
| ELECTROMAGNETIC WAVE ATTENUATION | (EPT°) | [ MINERALOGY | TEXTURE | STRUCTURE | FLUID ] |
| NATURAL GAMMA-RAY | (GR) | [ MINERALOGY | TEXTURE | STRUCTURE | FLUID ] |
| NATURAL GAMMA-RAY SPECTROMETRY | (NGS°) | [ MINERALOGY | TEXTURE | STRUCTURE | FLUID ] |
| HYDROGEN INDEX | (CNL°) | [ MINERALOGY | TEXTURE | STRUCTURE | FLUID ] |
| BULK DENSITY MEASUREMENT | (FDC° LDT°) | [ MINERALOGY | TEXTURE | STRUCTURE | FLUID ] |
| PHOTOELECTRIC CAPTURE CROSS SECTION | (LDT°) | [ MINERALOGY | TEXTURE | STRUCTURE | FLUID ] |
| THERMAL NEUTRON CAPTURE CROSS SECTION | (TDT°) | [ MINERALOGY | TEXTURE | STRUCTURE | FLUID ] |
| SONIC TRANSIT TIME | (BHC°) | [ MINERALOGY | TEXTURE | STRUCTURE | FLUID ] |
| SONIC ATTENUATION | (BHC°) | [ MINERALOGY | TEXTURE | STRUCTURE | FLUID ] |
| INELASTIC GAMMA-RAY SPECTROMETRY | (GST°) | [ MINERALOGY | TEXTURE | STRUCTURE | FLUID ] |
| DIPMETER | (HDT°) | [ MINERALOGY | TEXTURE | STRUCTURE | FLUID ] |
| CALIPER | (C) | [ MINERALOGY | TEXTURE | STRUCTURE | FLUID ] |
| THERMOMETER | (HRT°) | [ MINERALOGY | TEXTURE | STRUCTURE | FLUID ] |

FIG. 3

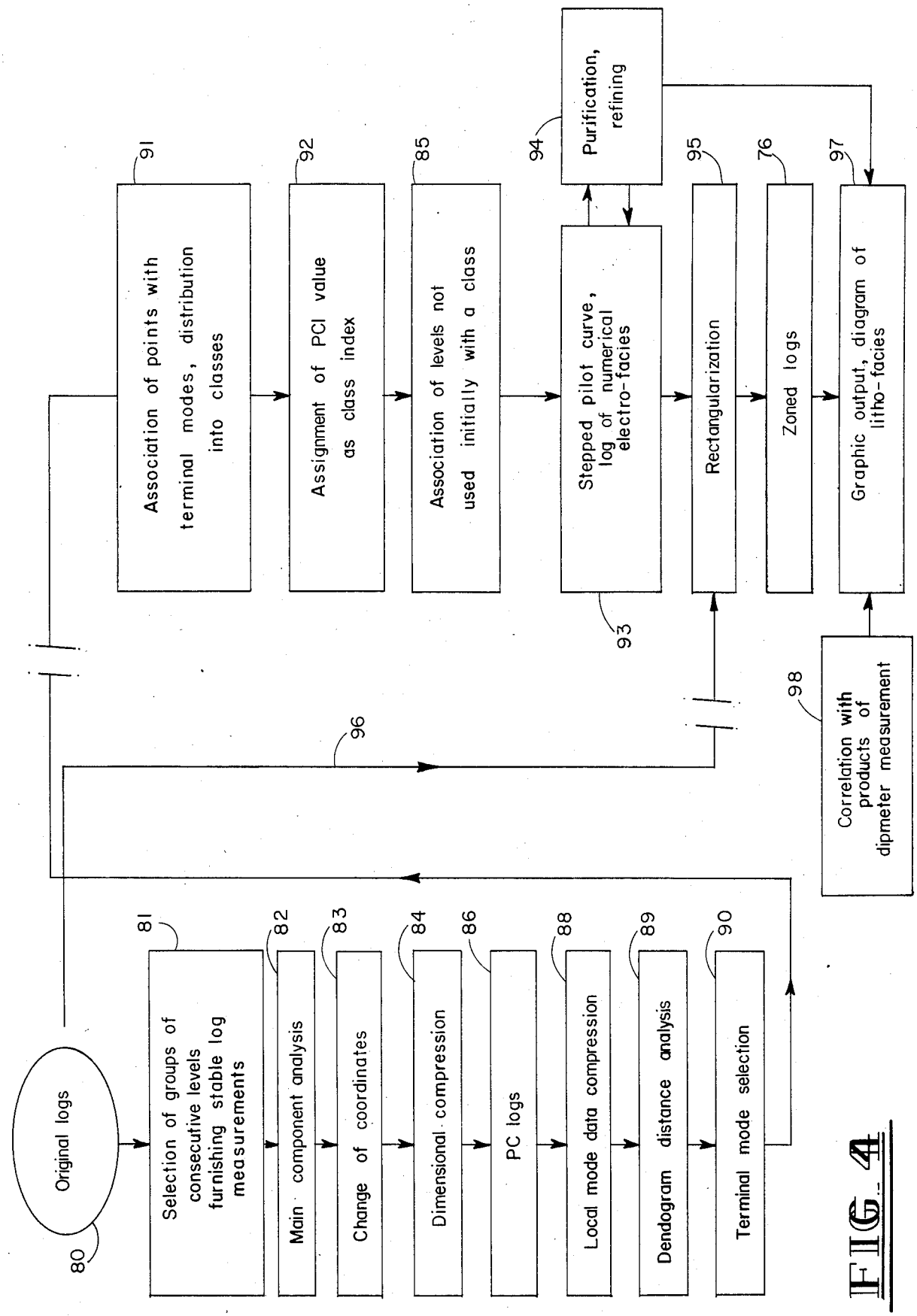

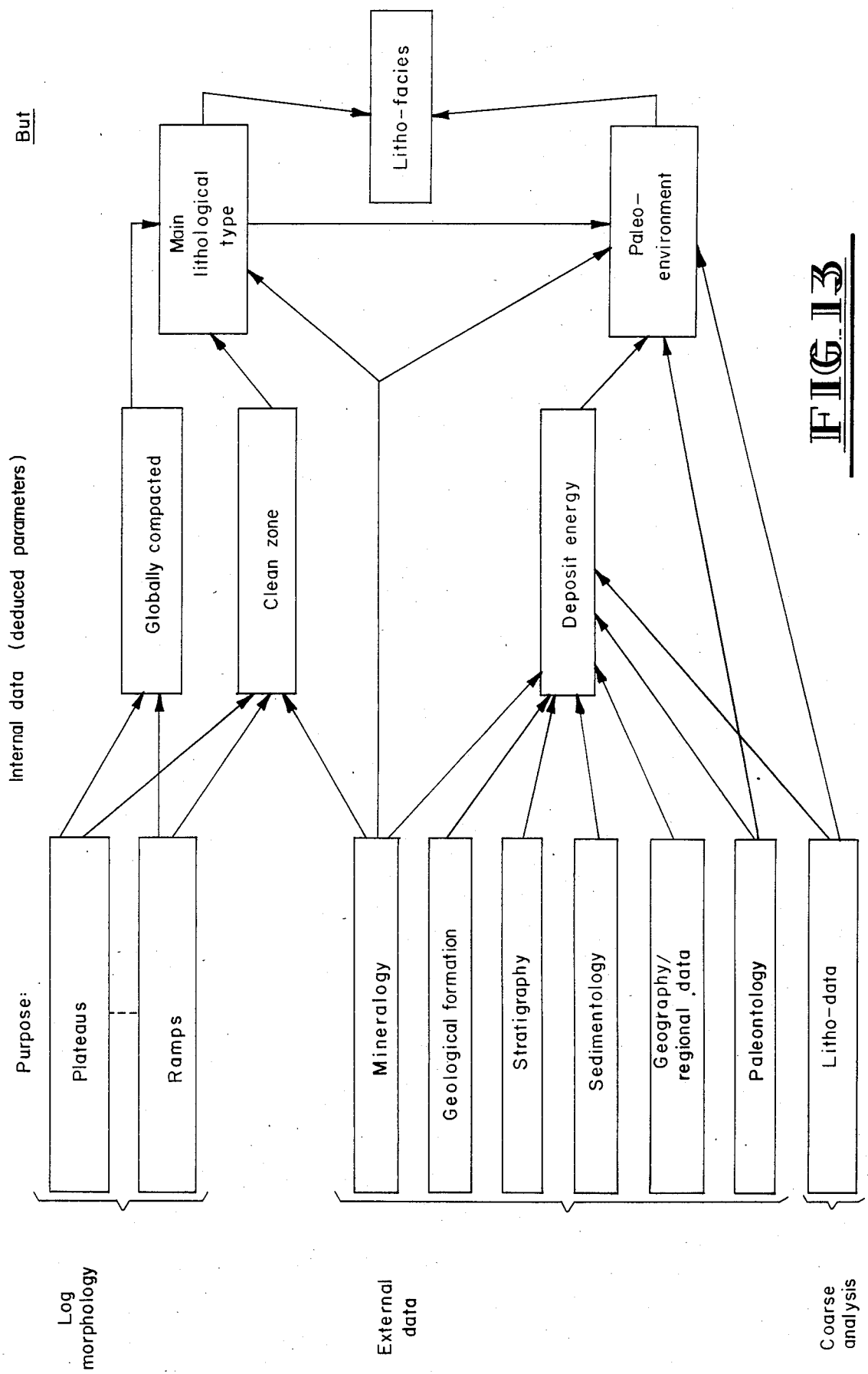

LOCAL MODES

| Original mode | Level | DK | End mode | Length | Coordinate of first main component |
|---|---|---|---|---|---|
| 14 | 194 | 0.5338E-01 | 14 |  | -1.479 |
| 50 | 793 | 0.1894E+00 | 14 | 3.518245 | -3.822 |
| 18 | 250 | 0.6136E-01 | 14 | 2.665318 | 0.950 |
| 48 | 768 | 0.9952E-01 | 18 | 2.414742 | -0.482 |
| 5 | 35 | 0.7991E-01 | 18 | 2.400007 | 2.974 |
| 26 | 342 | 0.1311E+00 | 18 | 2.244318 | 0.864 |
| 66 | 1147 | 0.1382E+00 | 48 | 1.214735 | -1.230 |
| 41 | 622 | 0.3471E+00 | 50 | 1.153079 | -4.886 |
| 34 | 502 | 0.8341E-01 | 5 | 0.978087 | 2.349 |
| 65 | 1100 | 0.7468E-01 | 18 | 0.961151 | 1.285 |
| 42 | 634 | 0.1609E+00 | 66 | 0.957348 | -1.693 |
| 52 | 845 | 0.2229E+00 | 48 | 0.942666 | 0.431 |
| 29 | 392 | 0.2688E+00 | 65 | 0.919751 | 1.368 |
| 20 | 273 | 0.1353E+00 | 18 | 0.911313 | 0.396 |
| 60 | 924 | 0.2178E+00 | 42 | 0.885803 | -2.404 |
| 8 | 88 | 0.8949E+01 | 5 | 0.784137 | 3.625 |
| 63 | 1023 | 0.1027E+00 | 65 | 0.779495 | 0.567 |
| 27 | 369 | 0.1082E+00 | 5 | 0.751325 | 2.724 |
| 57 | 901 | 0.2065E+00 | 50 | 0.698778 | -3.413 |
| 59 | 914 | 0.2494E+00 | 50 | 0.676255 | -4.262 |
| 15 | 217 | 0.8585E-01 | 14 | 0.666187 | -0.900 |
| 45 | 699 | 0.1150E+00 | 48 | 0.645763 | -0.621 |
| 37 | 535 | 0.2361E+00 | 66 | 0.642659 | -1.192 |
| 39 | 584 | 0.3167E+00 | 37 | 0.620191 | -1.710 |
| 69 | 1195 | 0.1938E+00 | 45 | 0.602404 | -0.201 |
| 56 | 894 | 0.2141E+00 | 50 | 0.599119 | -3.449 |
| 51 | 820 | 0.1760E+00 | 48 | 0.597773 | -1.077 |
| 47 | 726 | 0.2561E+00 | 59 | 0.589321 | -4.401 |
| 30 | 407 | 0.1535E+00 | 27 | 0.572646 | 2.317 |
| 23 | 301 | 0.1802E+00 | 18 | 0.521688 | 1.466 |
| 28 | 388 | 0.2684E+00 | 30 | 0.502700 | 2.100 |
| 24 | 316 | 0.1036E+00 | 34 | 0.488165 | 2.690 |
| 46 | 719 | 0.2306E+00 | 50 | 0.485434 | -3.395 |
| 17 | 236 | 0.1111E+00 | 15 | 0.481334 | -0.510 |
| 36 | 526 | 0.1471E+00 | 34 | 0.480835 | 2.452 |
| 38 | 558 | 0.1968E+00 | 66 | 0.474987 | -1.552 |
| 67 | 1171 | 0.1987E+00 | 66 | 0.471042 | -1.660 |
| 33 | 495 | 0.1039E+00 | 34 | 0.468678 | 1.884 |
| 11 | 165 | 0.1356E+00 | 17 | 0.454020 | -0.086 |
| 10 | 123 | 0.1095E+00 | 5 | 0.441039 | 3.132 |
| 2 | 6 | 0.8640E-01 | 5 | 0.439858 | 2.655 |
| 64 | 1030 | 0.8916E-01 | 65 | 0.437475 | 0.917 |
| 35 | 511 | 0.1304E+00 | 34 | 0.434854 | 2.753 |

FIG. 16A

|  |  |  |  |  |  |
|---:|---:|---:|---:|---:|---:|
| 35 | 511 | 0.1304E+00 | 34 | 0.434854 | 2.753 |
| 31 | 420 | 0.1882E+00 | 33 | 0.434664 | 1.637 |
| 43 | 661 | 0.1959E+00 | 42 | 0.412084 | −1.771 |
| 9 | 112 | 0.1745E+00 | 10 | 0.393606 | 3.116 |
| 68 | 1176 | 0.2172E+00 | 56 | 0.387337 | −3.629 |
| 58 | 907 | 0.2180E+00 | 56 | 0.384061 | −3.158 |
| 22 | 286 | 0.1532E+00 | 18 | 0.382649 | 0.797 |
| 54 | 854 | 0.2638E+00 | 43 | 0.368673 | −2.117 |
| 468→ 21 | 280 | 0.1617E+00 | 11 | 0.352316 | 0.182 |
| 32 | 458 | 0.1474E+00 | 36 | 0.339407 | 2.755 |
| 16 | 229 | 0.1688E+00 | 21 | 0.334567 | 0.451 |
| 454→ 49 | 775 | 0.2029E+00 | 50 | 0.326718 | −3.614 |
| 53 | 849 | 0.2084E+00 | 51 | 0.326146 | −0.919 |
| 40 | 615 | 0.1064E+00 | 63 | 0.321983 | 0.357 |
| 6 | 40 | 0.9727E−01 | 5 | 0.312592 | 2.662 |
| 460→ 13 | 186 | 0.7769E−01 | 14 | 0.310256 | −1.329 |
| 44 | 696 | 0.1634E+00 | 45 | 0.308952 | −0.503 |
| 61 | 940 | 0.1459E+00 | 66 | 0.282584 | −1.055 |
| 19 | 267 | 0.1443E+00 | 20 | 0.260018 | 0.575 |
| 25 | 327 | 0.8675E−01 | 34 | 0.256215 | 2.363 |
| 7 | 57 | 0.9681E−01 | 5 | 0.222047 | 3.054 |
| 1 | 3 | 0.1007E+00 | 2 | 0.201095 | 2.633 |
| 55 | 861 | 0.1321E+00 | 45 | 0.174645 | −0.763 |
| 62 | 959 | 0.1027E+00 | 63 | 0.165672 | 0.711 |
| 3 | 16 | 0.1133E+00 | 5 | 0.163406 | 2.843 |
| 464→ 12 | 168 | 0.1168E+00 | 17 | 0.122360 | −0.444 |
| 4 | 30 | 0.8910E−01 | 5 | 0.079914 | 2.942 |

FIG. 16B

TERMINAL MODES

| 376<br>Facies | 370<br>Mode | 372<br>Level | 378<br>DK | 363<br>Number<br>of levels | 360 | 362<br>Coordinate of main components | 364 |
|---|---|---|---|---|---|---|---|
| 1 | 41 | 622 | 0.3471E+00 | 7 | -4.886 | 0.522 | 0.256 |
| 2 | 50 | 793 | 0.1894E+00 | 176 | -3.822 | 0.541 | -0.188 |
| 3 | 60 | 924 | 0.2178E+00 | 27 | -2.404 | 0.263 | -0.010 |
| 4 | 42 | 634 | 0.1609E+00 | 59 | -1.693 | 0.781 | -0.116 |
| 5 | 14 | 194 | 0.5338E-01 | 102 | -1.479 | -2.051 | 0.222 |
| 6 | 66 | 1147 | 0.1382E+00 | 91 | -1.230 | -0.004 | 0.178 |
| 7 | 48 | 768 | 0.9952E-01 | 146 | -0.482 | 0.935 | -0.010 |
| 8 | 20 | 273 | 0.1353E+00 | 17 | 0.396 | -1.414 | 0.480 |
| 9 | 52 | 845 | 0.2229E+00 | 20 | 0.431 | 1.023 | -0.224 |
| 10 | 63 | 1023 | 0.1027E+00 | 85 | 0.567 | 0.132 | 0.199 |
| 11 | 26 | 342 | 0.1311E+00 | 16 | 0.864 | 0.238 | 1.749 |
| 12 | 18 | 250 | 0.6136E-01 | 34 | 0.950 | -1.006 | -0.117 |
| 13 | 65 | 1100 | 0.7468E-01 | 63 | 1.285 | -0.116 | 0.024 |
| 14 | 29 | 392 | 0.2688E+00 | 12 | 1.368 | 0.799 | 0.051 |
| 15 | 34 | 502 | 0.8341E-01 | 125 | 2.349 | -0.257 | -0.398 |
| 16 | 27 | 369 | 0.1082E+00 | 55 | 2.724 | 0.730 | -0.372 |
| 17 | 5 | 35 | 0.7991E-01 | 137 | 2.974 | 0.255 | 0.154 |
| 18 | 8 | 88 | 0.8949E-01 | 25 | 3.625 | 0.204 | -0.279 |

FIG.17

METHOD AND APPARATUS FOR DETERMINING GEOLOGICAL FACIES

This application is a continuation of co-pending application Ser. No. 768,171, filed on Aug. 22, 1985 and abandoned, which is a continuation of co-pending application Ser. No. 462,586, filed on Jan. 31, 1983 and abandoned.

BACKGROUND OF THE INVENTION

This invention relates to the geological study of subsoils notably for the location and exploitation of mineral deposits.

Mineral and petroleum prospecting is based upon the geological study and observation of formations of the earth's crust. Correlations have long been established between geological phenomena and the formation of mineral deposits which are sufficiently dense to make their exploitation economically profitable.

In this endeavor, the study of the facies of the rocks encountered takes on particular importance. By facies, notably of a sedimentary rock, is meant a set of characteristics and properties of a rock which result from the physical, chemical and biological conditions involved in the formation of the sediment and which have given it its distinctive appearance with respect to other sediments. This set of characteristics provides information on the origin of the deposits, their distribution channels and the environment within which they were produced. For example, sedimentary deposits can be classified according to their location (continental, shoreline or marine), according to their origin (fluviatile, lacustrine, eolian) and according to the environment within which they occurred (estuaries, deltas, marshes, etc.). This information in turn makes it possible to detect, for example, zones in which the probability of hydrocarbon accumulation is high.

There are various sources of information on the facies of formations. It may be provided by surface or subsoil observations, and notably by the study of core samples taken from rock studies, for example during the drilling of a borehole for an oil well.

The geological characteristics used for recognizing a facie include, in addition to the fossil fauna and flora:

The mineralogy, i.e. the mineral composition of the rock; silicate, carbonate, evaporite, etc.;

The texture: grain size, sorting and morphology, degree of compaction, of cementation, etc.; these parameters can be of decisive importance as concerns the permeability of rocks also exhibiting porosity values and other similar ones; they are related to the microscopic appearance of the rocks;

The structure: thickness of beds, their alternation, presence of stones, lenses, fractures, degree of parallelism of laminations, thickness of strata, etc.: all of which are parameters related to the macroscopic appearance of the rocks.

The petrophysical and petrographic characteristics of a rock, excluding the paleontological data, constitute the litho-facies of the rock. This consequently includes the descriptive characteristics of the rock independent of the genetics of formation and notably of deposition.

Other types of information coming from the subsoil can be used by the geologist for the investigation of facies. Such information can be provided by drill cuttings sent up to the surface from the bottom of a well by means of a fluid (generally mud) injected near the drilling tool.

It has already been noted that certain measurements of the physical characteristics of the formations traversed by a borehole made it possible to obtain valuable information for the interpretation of the facies.

Such measurements for determining the physical characteristics of the geological formations traversed by boreholes are presently carried out on a very large scale, notably in oil wells. They are carried out by means of sondes moved in the borehole, and the signals transmitted by the sonde give a recording (log) as a function of depth. They may involve highly varied characteristics resulting either from natural phenomena, such as the spontaneous potential or the natural emission of gamma rays, or from a prior stimulation of the formation by the sonde by the emission of electric current or acoustic waves, electromagnetic waves, nuclear particles, etc.

In the case of petroleum prospecting, the logs are useful in determining accurately the hydrocarbon-bearing strata and at investigating, in addition to the nature and quantity of such strata, the possibility of extracting the hydrocarbons from the rocks in which they are contained.

A substantial part of the log interpretation efforts up to the present time has tended toward the evaluation of the porosity of the reservoir rocks or matrices and their permeability, as well as the fraction of the pore volume occupied by these hydrocarbons. These so-called formation evaluation techniques generally also bring out other parameters such as the average matrix rock grain density and clay content.

These interpretation studes have also demonstrated and used correlations between the measurements furnished by logging tools and certain compositional characteristics of the rocks traversed by boreholes. For example, it is common to plot certain information on the readily identifiable lithology of the formations encountered as a function of borehole depth, a prime example being the proportion of limestone and dolomite of a rock at a given level of the well.

More recent studies have shown that very clear relations could in fact exist between the appearance or the evolution of certain characteristics in logging measurements and certain parameters of the litho-facies.

This raised the question as to whether it would not be possible to establish a correspondence between the different facies or litho-facies encountered within a formation interval and all the logging data obtainable in this interval so as to establish an "Electro-facies" or a "para-facies" constituting an image of the facies or of the litho-facies of the rock as seen through the logs.

This idea is based upon the notion according to which each log represents a response spectrum characteristic of the facies of the different zones along which it has been established, and that all these logs represent a respective "signature" of these facies or litho-facies.

It has however not been possible up to the present time to develop a method which, in a relatively constant, reliable and systematic manner, makes it possible to establish, from only the logging measurements made in a borehole over a given depth interval, a recording or a respresentation notably in the form of a graph which furnishes, as a function of depth, an image of the succession of the litho-facies present within this interval.

More specifically, it would be desirable to be able, on the basis of log measurements over a given depth interval in a borehole, to show within this borehole a set of sections or zones capable of being classified in correspondence (at least approximate) with the different facies or litho-facies present in the interval, so that all the zones corresponding to a similar facies or litho-facies belong to the same class.

SUMMARY OF THE INVENTION

It is the object of the present invention to provide a method and apparatus making it possible to obtain, in a reasonably reliable and essentially automatic manner, such a distinction and classification from log measurements over a depth interval of a borehole in order to produce one or more representations, notably graphs, characteristics of the facies present in this interval.

This method includes in particular the following steps:

Logs are made over a plurality of levels within an interval along the borehole in order to obtain a group of several measurements for each of these levels.

With each such level of the borehole interval is associated a sample within a multidimensional space defined by the different logs. The sample's coordinates are a function of the logging values measured at this level. The sammples thus obtained will form a scatter diagram within this multidimensional space, The samples of this scatter diagram are investigated in order to determine a plurality of characteristics modes each corresponding to a zone of maximum density in the distribution of these samples; each is regarded as a characteristic of a respective cluster and all the samples of this cluster are related to it, and A recording is made, as a function of depth, for example in graphic form, of a geological or physical characteristic of the formations within the borehole interval, assigning to each level a characteristic value set as a function of the mode to which the representative sample of said level has been related within the multidimensional space considered.

According to one feature of the invention, the exploration of the scatter diagram is done by analyzing the position of each of these samples in relation with the neighboring samples to define a respective density index, and the characteristic modes are determined by selecting local maxima of these density indices within the scatter diagram.

According to one embodiment of the invention, a facies or litho-facies is designated for each of the modes thus characterized and a graphic respresentation is produced as a function of the depth of the succession of facies or litho-facies thus obtained, for example by means of suitable graphic codes.

According to a preferred embodiment, the characteristic modes of each cluster or terminal modes are made up of samples coming from the measurements themselves. Each mode is thus characterized by log values actually obtained during the measurement.

Advantageously the selection of said characteristic modes is effected in two phases. In a first phase, one determines a set of local modes on the basis of the analysis of the local density maxima mentioned earlier. In a second phase, from among these local modes is chosen a small number of terminal modes on the basis of their mutual distance according to a predetermined relationship. In particular, by a clustering technique, one determines the local modes which exhibit the greatest overall dissimilarities. These terminal modes are each considered to be characteristic of a super-cluster. To each of these terminal modes is related a sub-group of local modes previously determined.

Thanks to this method, a limited number of classes is defined, each corresponding to one of the selected terminal modes which is characterized by a high density of representative points within this space and distinctive characteristics or dissimilarities which are clearly marked, according to the mutual distance of these modes in this space. In this way it is possible to enter each point of this space associated with a respective level in a class which can if necessary be characterized by a number or a set of values within the multidimensional space considered. These values are, of course, directly derived from the logging measurements and represent an "electro-facies" whose determination depends only on these measurements.

As each level is related to a class, it is possible to plot a graphic representation of this electro-facies as a function of depth, in which each level is assigned an index corresponding to the class to which it is related. After such a procedure, it is observed that the values thus attached to the levels are ordered according to a stepped curve in which the distance of each step from the depth axis corresponds to the index of a respective class. Each step covers several adjacent levels which fall within identical classes on thickness zone of varying size, each corresponding to a different electro-facies, with several zones representing the same electro-facies being capable of being located along the interval considered, separated by zones of different facies. From a designation of the litho-facies corresponding to each class, it is possible to plot a pattern of litho-facies as a function of depth. p Using the just described method, it has been possible to reveal a remarkable correspondence between geological facies, as they may be determined for example from the analysis of core samples in a given interval, and electro-facies defined by respective sections in the interval and their respective classes.

Thanks to this method, experimentation thus confirms the hypothesis formulated above whereby a determination, at least approximate, of the geological lithofacies can be derived from a suitable treatment of the logging measurements obtained within an interval of geological formations traversed by a borehole.

The technique recommended here can be realized by means of the main types of logs now existing (e.g. resistivity, conductivity, density, neutron porosity sonic velocity, etc.) which will be referred to here as standard logs.

This technique is moreover enhanced remarkably by the use of the results of dipmetering measurements which contain considerable structural information. This use can take on various forms. It is possible for example to integrate dipmetering results directly with the other logs. These results can then be expressed in the form of so-called synthetic logs which result from the extraction of special characteristics of dipmeter measurements. It is also possible to compare them with the depth of the transitions between electro-facies after a first processing in order to refine, according to an iterative process, the criteria making it possible to distribute the measurement samples in relatively uniform classes.

In general, the technique just described can be applied on the level of a field in which are made several boreholes or wells which encounter formations exhibiting analogies from the geological viewpoint.

Of course, there are preferred embodiments of the method according to the invention and these will be dealt with below. In addition, it goes without saying that the process for determining litho-facies from logs can only be advantageously guided by additional operations carried out manually or automatically and which can involve evaluation by experts or the specific knowledge of certain situations or regions as well as comparisons with other sources of information.

According to a particular embodiment, the procedure involves two steps. In a first step, one considers a multidimensional space of points obtained from groups of consecutive levels in the order of depths preselected according to a given criterion. According to this criterion, the only levels considered to belong to such a group of consecutive levels are those between which the value of each log does not undergo a variation greater than a given deviation value determined in advance and corresponding to the effects of holes or to uncertainties inherent in the measurement. An example of points not considered to belong to the groups of selected levels are those in the vicinity of which the logs undergo a relatively marked transition or evolve according to a ramp, or adopt a configuration in the form of a bump whose height is greater than the deviation range previously defined.

By means of groups of levels thus selected, the previously mentioned analysis is carried out in the multidimensional space of the logs. This gives a set of classes each of which characterizes an electro-facies present in the explored borehole interval.

In a second step, the position of the points is analyzed at the levels not considered in the first analysis in relation to the groups of levels which have been classified after the first step.

In particular, for each point or group of points not considered, an analysis is made of its position in relation to groups of adjacent, higher and lower, levels in the scale of depths and which have already been classified. This position analysis can be carried out advantageously through an analysis of the distances in the multidimensional space of the logs between the representative points of the levels not considered and the representative points of the adjacent upper and lower level classified, or a point considered to be representative of each group of such consecutive levels already classified.

This study makes it possible to bring out either sudden transitions corresponding to the limit between distinct facies, or ramps which are relatively less steep and corresponding to transitions between facies whose respective characteristics are similar, or, in the case of bump-shaped configurations, the existence of beds or strata of small thickness exhibiting a facies different from the immediately surrounding facies. This distance analysis then makes it possible not only to determine the types of situation (ramp or bump) encountered but also to locate in depth the corresponding transition(s) between different facies. For example, in the case of a transition ramp between a sand and a clay, the separation level of the two facies is fixed at a point having a maximum distance, in the space of the logs, from the groups of consecutive adjacent levels in depth which correspond respectively to the sand and to the clay. In the case of a bed of small thickness, the assignment of a facies to this bed is also carried out on the basis of the distances of the points of this bed, in the multidimensional space of the logs, from the facies which surround it in the space of the depth.

This, according to this embodiment, the first step identifies the electro-facies simply on the basis of stable sampling intervals by means of an analysis in the multidimensional space of the logs without regard to depth. On the other hand, the second step reintroduces the depth element from the assignment of facies to the sampling levels which were not considered in the first step.

According to a preferred embodiment of the invention, one considers, for the determination of the modes characterizing the electro-facies, or terminal modes, a multidimensional space in which all the points or samples representative of the different levels in the interval considered are related to a system of axes made up of at least two main components of the scatter diagram formed by this set of points. Furthermore, it is preferred to make this determination of terminal modes in a space whose number of dimensions is small compared with that of the space of the logs used, by choosing or selecting only the most significant main components on the basis of their maximum variability with respect to the distribution of the scatter points.

Thanks to this technique, it is possible to arrive at a selection which is both efficient, i.e. relatively fast if one considers the processing time, and correct, i.e. providing results which are utilizable in practice for determining the electro-facies.

Of course, from the determination of a plurality of terminal modes over a given depth interval with the class assigned to each of them, it is possible not only to plot a stepped graph representative of the said levels assigned to the corresponding class index, or the representation of a sequence of facies, but also to plot a curve representative of any desired characteristic as a function of depth, by assigning to all the levels falling within the small class the same value of this characteristic, for example an average value for all the levels falling within this class.

According to a feature of the invention, the distribution of the clustered measurement samples which are each characterized by a respective mode is used to simplify the log data interpretation operations or formation evaluation. These well-known operations make it possible to provide information on the porosity of the formation traversed and their fluid content, notably their hydrocarbon content, as well as the ease with which these fluids can flow within the cavities in which they are located. It has in fact been observed that it was possible to obtain good quality results for this evaluation by means of a data compression technique in which, instead of carrying out the required processing for each level of a borehole interval, one considers only the measurements obtained at the levels corresponding to chracteristic modes of a respective cluster. According to another feature of the invention, the designation of the litho-facies corresponding to each measurement sample or to each mode is carried out in an essentially automatic manner. For this purpose, one considers, in the space of the logs plotted, a volume characteristic of each litho-facies capable of being encountered in the formations traversed by the borehole interval considered. These volumes are defined from previous measurements carried out in these formations under given borehole conditions. An analysis is made of the position of each measurement sample or characteristic mode of a cluster in the multidimensional space of the logs in relation to these characteristic volumes to assign to each of these samples or modes a corresponding facies or lithofacies. This assignment can be made on the basis of a calculation of the distances from the sample or mode considered to the point defining each volume characteristic of a distinct litho-facies. In the event of conflict between concurrent litho-facies, provision is made for differentiating the latter on the basis of their respective possibilities.

According to an embodiment of this invention, from the possible litho-facies a subassembly of probable litho-facies in the considered bore hole interval is selected. Each is then assigned a respective plausibility index. These plausibility indices can be used to clear up conflicts or ambiguities in the determination of the litho-facies of the measurement samples.

These most plausible litho-facies are advantageously selected by means of an artificial intelligence procedure in which one takes into account not only the results of a rough analysis of the lithology of the borehole interval obtained from respective logs but also information relative to the morphology of these logs and also data external to the borehole. This step can advantageously be applied by means of an interactive program in which a machine initiated dialog is established between a processing machine and an operator who gives the machine the data at his disposal.

BRIEF DESCRIPTION OF THE DRAWINGS

FIG. 3 is a comparative table of the sensitivities of different types of currently used logs to the characteristic factors of the litho-facies;

FIG. 4 represents schematically, in the form of a flowchart, the implementation of the method according to the invention;

FIG. 13 illustrates an automatic process used in an alternative embodiment of the invention;

FIGS. 16A and 16B illustrate a Table I respresentative of the characteristics of a set of segments connecting local modes; and FIG. 17 illustrates a Table II giving characteristics of the terminal modes selected in the example of FIG. 16.

DESCRIPTION OF THE PREFERRED EMBODIMENT

Figure 1:
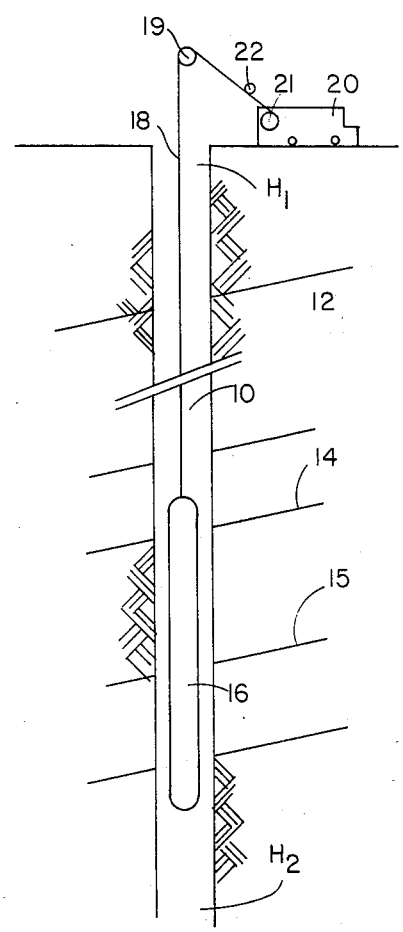
FIG. 1 is a schematic representation of logging equipment in operation in a borehole.

In FIG. 1 is shown logging equipment in a borehole 10 going through sedimentary formations 12 made up of strata represented schematically by separation planes such as 14 and 15. The equipment includes a sonde 16 of elongated form and capable of being moved in the borehole 10 at the end of a cable 18 from which it is suspended and which connects it both mechanically and electrically, by means of a pulley 19 on the surface, to a control installation 20 equipped with a winch 21 around which the cable 18 is wound. The control installation comprises, notably, recording and processing equipment known to the art and making it possible to produce graphic representations called logs of the measurements obtained by the sonde 16 according to the depth of the sonde in the borehole or well 10. This depth is effectively a function of the length of cable wound and is detected by means of a roller 22 bearing on the cable.

Figure 2:
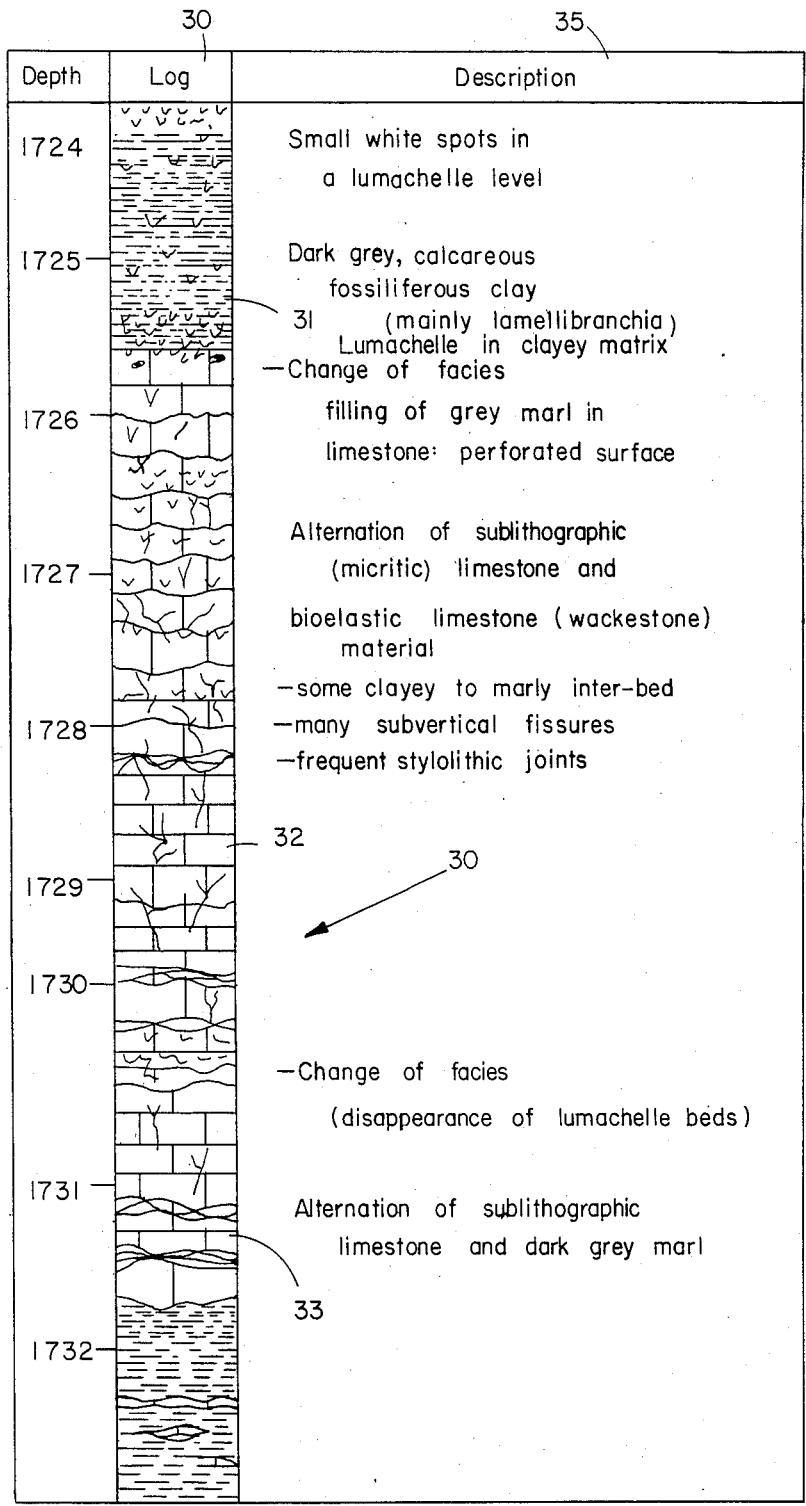
FIG. 2 is a diagram showing facie information as a function of the depth of an investigated borehole interval.

FIG. 2 represents the results of a geological analysis of a core sample in a borehole. The results are presented as a function of depth in a log 30 using a conventional representation of the geological structure revealed by the core sample. This representation 30 is composed of a series of beds such as 31, 32, 33 or zones of facies differentiated by a different symbolic representation. That of the bed 31 corresponding, for example, to a clay, that of the formation 32 to a limestone, and that of the formation 33 to a different variety of limestone. The facies of these different zones is described in a column 35 entitled "Description". From the geological viewpoint, each of these successive zones is characterized by a relative homogeneity defined by a set of characters which vary from one zone to another. These characters, which depend in particular on the mineralogical composition, the texture and the structure of the rocks making up these zones, define respective litho-facies. Their study makes it possible to obtain information on the conditions under which these rocks were formed.

The response of sonde 16 as it is moved in the borehole 10 depends on the formations traversed by the borehole. The sonde applies different measurement techniques to the formations traversed and it is thus possible to obtain information of a quantitative type on the reservoirs encountered thanks to a suitable combination of the information provided by different types of logs. These have been standardized so as to furnish measurements at discrete levels separated by equal depth intervals. The techniques for correlating different logs in depth for this purpose are of a classical nature. They allow the automation of measurement data interpretation in order to obtain, for example, estimates of the porosity of the rocks encountered, the pore volume occupied by hydrocarbons, and the ease of flow of hydrocarbons out of the reservoirs in the case of petroleum prospecting.

Techniques for analyzing formations of the type mentioned above are well known, for example under the name of SARABAND and are described for example in French patent published under the number 2,080,945 corresponding to U.S. Pat. No. 4,495,604.

However, as each of the different logs is affected not only by the fluid content of the rocks traversed by the borehole but by all their other physical characteristics, it is desirable to also consider obtaining information on the geological structure of the formations encountered which, in turn, can be used for determining, by actual geological considerations and on the scale of a field, a basis or a region, the probable accumulation zones of hydrocarbons having an economic value.

FIG. 3 represents a table providing information of a qualitative nature on the sensisitivity of the different types of logs to the main geological factors characterizing the rocks in which these logs are made.

In the left-hand column 50 of FIG. 3 are indicated different parameters of which a measurement can be obtained by logging, opposite which, in column 51, is given an abbreviated designation of the corresponding tool. The methods and tools making it possible to obtain the 16 parameters (a) to (p) of column 50 are all well known in the field of geophysical measurements in boreholes. In the patents previously mentioned can be found references to documents describing these measurement methods. We shall thus confine ourselves here to indicating certain patents covering some of the most recent logging methods: for electromagnetic progagation time parameter (c), U.S. Pat. No. 3,944,910; for electromagentic wave attenuation parameter (d), U.S. Pat. No. 3,944,910; for natural gamma ray spectrometry parameter (f), U.S. Pat. No. 3,976,878; for the photoelectric capture cross section parameter (i), U.S. Pat. No. 3,922,541; for the thermal neutron capture cross section parameter (j), the U.S. Pat. No. 3,971,935; and for nonelastic gamma-ray spectrometry parameter (m), U.S. Pat. No. 4,055,763.

For each type of log (a) to (p) has been indicated in column 52 the degree to which it is influenced by the mineralogy of the rock encountered, using three types of characters ranging from the boldest to the smallest depending on whether the parameter in question is more or less sensitive to this mineralogy.

Similarly, in column 53 has been indicated for each of the parameters (a) to (p) its sensitivity to the texture of the rocks traversed by the borehole and, in column 54, its sensitivity to the structure of the rocks, according to a scale with three degrees similar to that used for colunm 52.

Finally, in column 55 is given a qualitative indication of the sensitivity of the parameters (a) to (p) to the fluids contained in the formation, fluids which can in particular consist of petroleum, gas or water of variable salinity.

The observation of the table in FIG. 3 suggests that it is possible to establish a correspondence between, on the one hand, different litho-facies characterized by the mineralogical factors, texture and structure and, on the other hand, electrofacies which can be obtained directly from a suitable quantitative analysis of a set of logs taken for example from the logs of column 50.

The possibility of establishing such a correspndence between electro-facies and litho-facies is capable of providing a precious aid in the geological knowledge of a zone of the earth's crust within a given region, such knowledge being useful in completing the information usually available to geologists and, in certain cases, helping them in the interpretation of the facies encountered to obtain information on the history of the formations and for determining the concentrations of minerals sought.

It was thus noted that it was possible to make use of the specific sensitivities of each log in a set of logs at least to produce an approximate image of the lithofacies. This image is obtained from an investigation of zones over a given interval of a borehole and is capable of being classified in a set of classes.

To accomplish this, one begins with n number of logs obtained over a borehole interval $H_1$, $H_2$ (FIG. 1). The measured values are discretized and correlated in depth so as to have, for each level of the interval considered, a plurality of distinct log values. A typical value of an interval between consecutive levels is 15 centimeters (six inches).

According to a preferred embodiment, the successive log values thus obtained in 15-centimeter intervals are analyzed so as to determine groups of consecutive levels for which said log values remain within a range defined by an upper value and a lower value. This range is determined by considering the interval of the possible variations of each log according to borehole conditions, for example the roughness or caving of borehole walls, and errors inherent in the measurement itself. It is in fact possible to consider that, for all the levels whose measurements fall within such a range, the physical characteristic measured by the log conserves a substantially constant value. Within a given depth interval, it is possible to find several groups of levels which fulfill this condition for average values of this characteristic which may be altogether different from each other.

Outside of the groups of consecutive levels which are characterized by a certain stability of the corresponding log value are found other levels which do not exhibit these stability characteristics. In particular, if a given log is considered, there are ramp phenomena in which a first and a second group of consecutive levels, for which the log is relatively stable at a first and a second respective characteristic value, are connected by levels for which the log evolves between the characteristic value of the first group and the characteristic value of the second group. There are also situations in which, between two groups of levels characterized by relatively stable values, there are consecutive levels for which the values of the log are quite far from the first and the second values characteristic of each of the two stable level groups, thereby revealing the presence between these two groups of a stratum or a bed of small thickness whose geophysical characteristics are substantially different from those of the beds surrounding it. In this case, the log shows a relatively marked bump or peak.

In both cases, these bumps and these ramps are the result of a convolution of the measurement owing to the insufficient resolution of the measurement tools.

Figure 5:
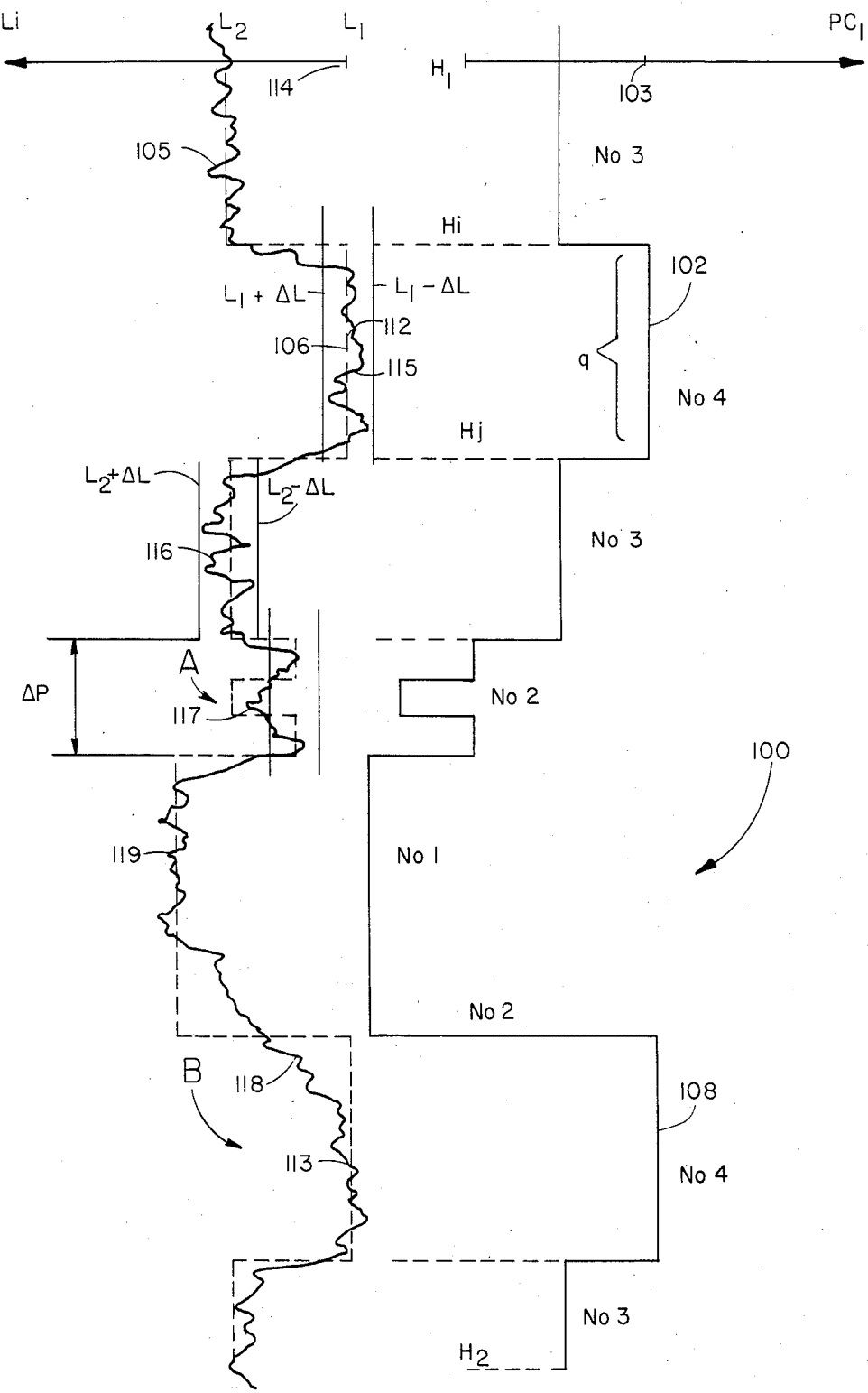
FIG. 5 is a diagram representative of curves plotted as a function of depth.

In FIG. 5 a log is represented in which the curve 105 represents the fluctuations of a variable Li as a function of the depth measured in the direction perpendicular to the axis $L_i$. In this figure a portion 115 of the curve 105 has values which are located between a bound $L1-\Delta L$ and a bound $LI+\Delta L$ for a set of consecutive levels.

One also notes for a portion 116 of the curve another group of consecutive levels whose values remain between two levels $L2+\Delta L$ and $L2-\Delta L$. The transition between the portion 112 and 116 is relatively sudden. The difference $2 \Delta L$ corresponds to a tolerance interval for the measurements of the characteristic Li as a function of the borehole conditions and of the uncertainty inherent in the measurement.

Also represented is a portion 117 of the curve 105 which forms a bump with a relatively steep front such that it is not possible to define over the depth interval $\Delta P$ a group of levels for which the measured value L remains within a variation range $2 \Delta L$.

At 118 another type of situation is represented in which such a group of levels cannot be recognized. What is involved is a ramp 118 in which the value of the measured variable tends to grow more or less regularly between a first and a second portion 113 and 119 of the log 105 and in which the level of the log remains relatively stable at different respective values.

According to the preferred embodiment described here, a first analysis is made of all the logs to identify only the measurements which correspond to groups of consecutive levels in which these measurements can be regarded as stable. The following discussion will exclude all the levels which do not correspond to such stable groups.

We consider a space with several dimensions, each corresponding to one of the n logs. With each depth level not excluded may be associated a point in this space of which each coordinate consists of the value of the measurement of the respective log.

Thus, in the space considered, all the measurements made over the interval $H_1$, $H_2$ are represented by a scattering of points or samples.

The observation of such a scattering of points shows that, in practice, for a given depth interval, the distribution density of these points is far from being uniform. These points tend to group in the form of clusters in which the concentration of the points is relatively high, and which are more or less clearly separated from each other by zones containing relatively few points. Each of these clusters corresponds to a set of particular physical characteristics which it may be desired to represent by a characteristic point of this cluster.

In order to facilitate the interpretation and the characterization of said clusters, it is convenient to proceed, by means of data processing equipment in control installation 20 of FIG. 1, with a series of operations represented in FIG. 4.

We begin with the scatter of points defined by the value of the different logs at the different selected levels of the investigated borehole interval. These values are stored in memory, block 81, FIG. 4, and an analysis is made of the main components of this scatter in space (or axes of maximum inertia) in step 82 according to a technique which will be described later.

We then consider a reference system whose coordinates are the main components determined in step 82 and we transform the coordinates of the points of the scatter of the space 81 so as to represent them in step 83 in the space defined by the main components.

The number of dimensions of this space is then, in step 84, reduced so as to adopt for the representation of the scatter only the coordinates defined by the most significant main components and so as to reject those which correspond essentially to measurement noise. The scattering of points associated in this space with each depth level is thus defined by a number of coordinates smaller than the number of original logs. This reduction in the number of dimensions is made possible by the existence of correlations between the logs, with the elimination of the other factors corresponding to a negligible loss of information in many situations.

A graphic representation is made preferably of the values of each of the main components adopted as a function of the depth of the levels with which they are associated so as to obtain, in step 86, logs of main components which we shall call PC logs hereinafter.

In the space of the selected main components, an analysis, in step 88, is made of the clusters composing the scatter of points by a data compression technique in which, for each cluster of points in the space, a local mode is defined which is obtained here by the selection of one of the points of this cluster where there is a maximum point distribution density.

The analysis is continued by a study, in step 89, of the mutual distances between the local modes thus determined which can be represented graphically by a tree-type construction or dendrogram.

A selection is then made from among the local modes according to their mutual spacing so as to adopt, in step 90, only a limited number of modes called terminal modes whose mutual distances are the greatest and which correspond to respective groups of characteristics exhibiting maximum dissimilarties. This selection is followed, in Step 91, by the assignment of each of the scatter points, in the reduced main component space, to one of the selected terminal modes, all the point assigned to a terminal mode being grouped in the same class. Each class, in step 92, may be assigned an index taken, in this example, equal to the value of the first main component ($PC_1$) of the respective terminal mode.

Thus, each of the levels belonging to one of the groups of selected levels at the outset for the first step of the analysis can be related to one of the classes just determined. Consecutive level groups can then appear in the space of the depth which belongs to the small class and thus correspond to what is referred to as the same electro-facies.

The method includes a second step in which each of the levels set aside during the first step is also assigned to a class of electro-facies. During this second step, each of the levels initially set aside is tested to determine whether it belongs to a ramp or a bump. The test is carried out in the space of the main components by calculating the distance from the representative point of this level in this space to the representative points of the two groups of consecutive levels classified during the first step and which are closest to the tested level, on each side of it in the space of the depths. This distance calculation can be carried out with respect to each point of this group of levels or any of them, for example a representative local mode.

It is significant that this determination of the distance of each of the points initially set aside is carried out with respect to two groups of adjacent classified levels, one over and the other under in the space of the depths. Such a distance analysis for all the levels corresponding, for example to the portions 117 or 118 of the curve 105 of FIG. 5 makes it possible to show the type of evolution of the characteristics calculated for each of the levels separating two groups of classified levels. It makes it possible in particular to show evolutions in the form of a ramp, a bump or a bell.

In the case where a ramp is thus detected, it is assumed that each point of the ramp belongs to one of the two electro-facies which flank it and we place the transition between these two electro-facies at a point of this ramp which is equidistance in the space of the main components from the points representative of two groups of adjacent levels in the space of the depths.

In the case of a bump-shaped distribution, such a distance analysis makes it possible to determine the transition levels in depth limiting a relatively thin bed. As a function of the maximum Euclidean distance between the points representative of the levels of this bed and the surrounding groups of classified levels, this distance analysis also makes it possible to assign this thin bed to one of the classes already determined during the first step or to assign it a different classification if none of the classifications already determined during the first step appear to correspond to it.

After these two steps, the classification obtained can then lead to the plotting, in Step 93, of a pilot curve in which is represented, as a function of depth, the class index assigned to each level. A stepped curve 100, shown in FIG. 5, is thus obtained in which there are as many different step values as there are selected classes. Thus, for example, the plateau 102 is composed of a succession of adjacent g levels in a given depth zone Hi, Hj within the borehole interval $H_1$, $H_2$ and which, after the analysis of the blocks 88 to 92 and 85, fall within the same class represented by the abscissa 103.

This pilot curve 100 illustrates the fact that, after the analysis, the adjacent levels tend to group in zones of variable thickness, with several distinct zones corresponding to the same class, i.e. having similar characteristics which may be shown within the considered interval. The curve 100 is thus a numerical electro-facies log, each class index number constituting a brief identification of a respective electro-facies.

An optional step, shown in step 94, for the purification or refinement of results in which manual intervention may in certain cases permit certain corrections and allow the introduction into the process of information obtained through knowledge of local geology.

One of the products of the pilot curve 93 can consist of a rectangularization of the logs forming the starting point 80 of the process, steps 95 via 96 in FIG. 4; this step can benefit from a possible refining operation in step 94.

According to an embodiment of the present invention, the rectangularization of a log can be carried out by plotting, for each depth zone as defined by a plateau such as 102 of the curve 100, a plateau whose abscissa on the scale of the parameter Li measured by this log is equal to the average of the values of this log $L_j$ for all the levels which fall within the index class 103.

The log $L_j$ 105 has been represented in solid lines as a function of the depth as actually measured, the broken lines being the rectangularized curve 106 for this same measurement parameter. It is noted in particular that for the zones 102 and 108 defined by the pilot curve 100 and which are assigned the same class index 103 the respective plateaus 112 and 113 of the rectangularized curve are at the same abscissa value 114.

A subsequent product of this step 76 can consist in plotting zoned logs, i.e. logs assigned a single and unique value for all the levels which fall within a given class of the electro-facies log 100, this value being the value actually measured at the level which corresponds to the terminal mode giving rise to the considered class. The zoned logs are thus made up of values actually measured and not of averages, unlike the product of step 95.

In a particular embodiment, the value of the first main component is selected for all the levels of the same class and the average is calculated, this value being compared with the corresponding class index, or modal value, of said main component for the terminal mode corresponding to this class. The different between this average and this modal value furnishes a quality of criterion for the electro-facies represented by this class.

On the basis of the process leading to the numerical electro-facies log just defined, it is possible to produce an image of the litho-facies of the formations encountered. The correspondence between litho-facies and electro-facies may if necessary be detailed by an intervention involving data external to the logs. It is of interest to furnish, at step 97, a graphic representation of the litho-facies by means of conventional diagrams similar to those represented for example in the left-hand part of FIG. 2. This graphic representation can be obtained by recording means or automatic plotting means in a graphic band parallel to the axis of depth along with other recordings either of original measurements or of the results of their processing.

The determination of the terminal modes and the local modes, can also be used in order to simplify the calculations needed for interpretative processing of measurements such as that carried out in order to analyze the formation according to conventional interpretation techniques using a computer.

Finally, the graphic outputs of the step 97 may benefit, not only from the operations of step 94 but also from the establishment of correlations with dipmetering products. It is possible in particular to use, in step 98, along with the curves of electro-facies or derivatives of their determination, results of programs such as GEODIP (see for example French Pat. No. 2,185,165, and U.S. Pat. No. 4,320,458).

The dimension compression technique summarized in reference to steps 82 to 84 of FIG. 4 is described below in greater detail.

When one analyzes a scattering of points representative of the logs carried out on a succession of levels in a borehole interval, it is noted that the distribution density of these points in the scatter varies.

Figure 6:
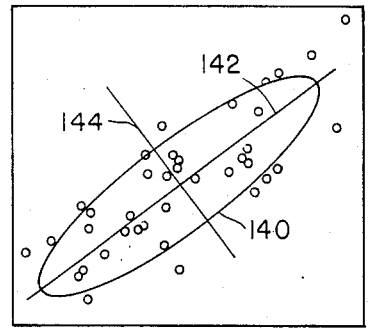
FIG. 6 illustrates the scattering of points representative of values of two characteristic parameters of the formations, measured within a given depth interval.

It is noted in particular that the points of the scatter are not distributed in the same manner in all directions. On the contrary, they tend to become oriented in privileged directions corresponding to directions of maximum variability of the distribution of these points in this space. Thus, in a two-dimensional space, a scatter represented by the FIG. 6 tends to fall within an approximately elliptical envelope 140, and the maximum variability directions of this scatter can be represented by the major axis 142 of this ellipse for the main direction of variability, or first main component, and by the minor axis 144 of the ellipse for a second component or main direction of variability in a direction perpendicular to the first. The clusters of points encountered can take on very diverse forms. For example, in the diagrams with two dimensions, one consisting of neutron porosity measurements (CNL tool) and the other of density measurements such as they result from an FDC tool, there are point distributions having a form similar to that of a boomerang. This is typical of the presence of zones with a high percentage of clay in conjunction with sand or sandstone.

The first main component is determined, by statistical processing, as the line for which the sum of the Euclidean distances from the points of the scatter to this line is smallest. In other words, if the points of the scatter are projected orthogonally on this line, the sum of the distances between these points and their respective projections is the smallest. The second main component is determined by considering, from among the lines perpendicular to the first main component, that for which the sum of the distance from the points of the scatter to this line is smallest. What is involved is hence a determination in a sub-space excluding the dimension of the main component. If the scatter is plotted in n dimensions, it is possible to determined n main components each corresponding to a direction of maximum variability in a sub-space perpendicular to the previously determined components.

The mathematical processing which makes it possible to obtain the main components includes the determination of the scatter correlation matrix. Each term of the correlation matrix between two dimensions i and j (i.e. two different measurements or logs) obeys the definition:

$$C_{ij} = \frac{\sigma_{ij}}{\sqrt{\sigma_{ii}} \sqrt{\sigma_{jj}}}$$

in which the coeffients $\sigma_{ij}$ are covariance coeffients determined by the relation $$\sigma_{ij} = \sum_{l=1}^{n} (x_l^i - x_m^i)(x_l^j - x_m^j)$$

In these relations, $x_l^i$ is the value of the log i for the point $x_m^i$ is the average value of the measurements of logs which can be expressed in the form:

$$x_m^i = \frac{1}{N} \sum_{l=1}^{n} x_l^i$$

is the total number of points in the scatter.

In view of the correlation matrix of the scatter, according to the expression:

$$M_c = \begin{bmatrix} c_{11} \cdots c_{1n} \\ c_{21} & \cdot \\ \cdot & \cdot \\ \cdot & \cdot \\ c_{n1} & c_{nm} \end{bmatrix}$$

the main components of the scatter are the actual vectors of this matrix.

In the determination of the correlation coefficients, we normalize perferably the value of the measurements before the calculation. This normalization can be carried out for example by bringing the variability interval of all the logs to a common value, for example 0 to 100. Of course, other hypothesis can be used. For example, for certain measurements such as resistivity, the logarithm of the measurement can be normalized.

Thus, the first main component $PC_1$ is the direction of maximum variability.

The second main component $PC_2$ is the direction of maximum variability of the scatter in a plane or a hyperplane perpendicular to the first main component.

The third main component $PC_3$ is the direction of maximum variability of the scatter perpendicular to the preceding two main components, and so on.

When all the main components $PC_1$ to $PC_n$ corresponding to the scatters have been determined, the coordinates are changed to express the position of the points of the scatter in the system of axes made up of the main components (or maximum inertia axis) thus determined. The transformation takes place linearly by means of a computer using the knowledge of the specific vectors of the correlation matrix.

In practice, the existence of main components or main axes of inertia reflects the presence of correlations between the physical characteristics measured by the logs. The coordinates of the points of the scatter along the first main component, for example, furnish a measurement of an underlying factor present in the formations encountered by the sonde and for which the different types of measurements made have a tendency to respond in the same direction in a more or less marked manner.

We consider for example a borehole interval over a depth of about 180 meters and including 120 equidistant measurement levels spaced by about 15 cm each.

In this borehole interval the following logs have been plotted:

RHOB: density measurement
PHIN: porosity measurement by CNL neutron tool (see Table in FIG. 3)
GR: natural gamma radiation measurements
HRT: temperature measurement
HRXO: inverse of square root of resistivity measurement near the wall of the well in the "invaded" zone
DT: acoustic wave transit time measurement
RT: measurement of resistivity of formation far from well or borehole
RXO: measurement of resistivity near borehole wall.

Only the first six measurements are considered for determining the main components. They are called active logs as opposed to the lasst two resistivity measurements called passive logs.

An elementary statistical analysis is made of the values obtained for these different measurements. From this is determined, for example, the average, the standard deviation, the maximum, the minimum and the dynamic interval between consecutive values. A calculation is then made of the correlation indices between each type of measurement carried out in the borehole interval. The results of this calculation can be expressed by a correlation matrix according to the relation (4) above. This matrix is constructed in the six dimensional space of the active logs.

The specific vectors of the correlation matrix are then determined. It is possible to deduce therefrom the inertia of the scatter of 1200 points in relation to each of the main components. The calculated values appear in the table below:

| Main Axis | Inertia | In Percent | Cumulative Percent |
|---|---|---|---|
| 1 | 1.5130 | 85.5 | 85.5 |
| 2 | 0.5633 | 9.4 | 94.9 |
| 3 | 0.1389 | 2.3 | 97.2 |
| 4 | 0.0957 | 1.6 | 98.8 |
| 5 | 0.0452 | 0.7 | 99.5 |
| 6 | 0.0269 | 0.4 | 100.0 |

It is noted that the inertia of the scatter in relation to the first main component is 85.5% of the total of the inertias. The cumulative inertia relative to the two main components amounts to 94%.

This means that by themselves these two main components make it possible to translate the major part of the information contained in the logs in relation to the formations traversed by the considered borehole interval.

The determination of the correlation coefficient of each log carried out with the six main components obtained reinforces this observation. These components are designated $PC_1$ to $PC_6$ in the order of decreasing inertia in the following table:

| Log | PC$_1$ | PC$_2$ | PC$_3$ | PC$_4$ | PC$_5$ | PC$_6$ |
|---|---|---|---|---|---|---|
| RHOB | 0.907 | 0.315 | 0.244 | 0.133 | 0.005 | 0.036 |
| PHIN | −0.975 | −0.107 | −0.064 | 0.128 | 0.064 | 0.116 |
| GR | −0.745 | −0.658 | −0.078 | −0.075 | 0.032 | 0.001 |
| HRT | −0.970 | −0.099 | 0.160 | 0.079 | 0.128 | −0.081 |
| HRXO | −0.958 | −0.074 | 0.209 | −0.155 | −0.082 | 0.052 |
| DT | −0.972 | 0.069 | −0.014 | 0.176 | −0.130 | −0.053 |
| Passive | | | | | | |
| RT | 0.746 | 0.154 | −0.286 | 0.007 | −0.165 | 0.137 |
| RXO | 0.763 | 0.126 | −0.281 | 0.064 | −0.137 | 0.029 |

The coefficients in this table each illustrate the extent to which the values of the main components associated with the different points of the scatter correlate with each of the logs plotted in the borehole interval.

It is thus possible to say that if a log is plotted as a function of the depth of the values of the first main component for each of the levels of the scatter, one obtains a correlation index of almost 90% between the variations in this first main component and that of the measured density. It is noted that these correlations are very close between the first main component and each of the measurements made. They are less so, except in the case of the gamma-ray measurement, for the second main component. They tend to become negligible for the other main components.

This observation is used to limit the analysis of the scatter of points representative of measurements carried out on the considered borehole interval to a space with two dimensions, possibly three, if we remain within the space of the main components. This reduction in dimensions in fact makes it possible to simplify the operations for recognizing clusters in the scatter and the characterization of each cluster.

The dimensional compression of the space of the scatter analyzed, in step 84 of FIG. 4, can thus be carried out using only the main components whose cumulative inertia exceeds a predetermined threshold.

This selection can be completed and its validity verified by other means. For example, it is possible to plot the logs of the values of the main components rejected or to be rejected over the interval.

Figure 7:
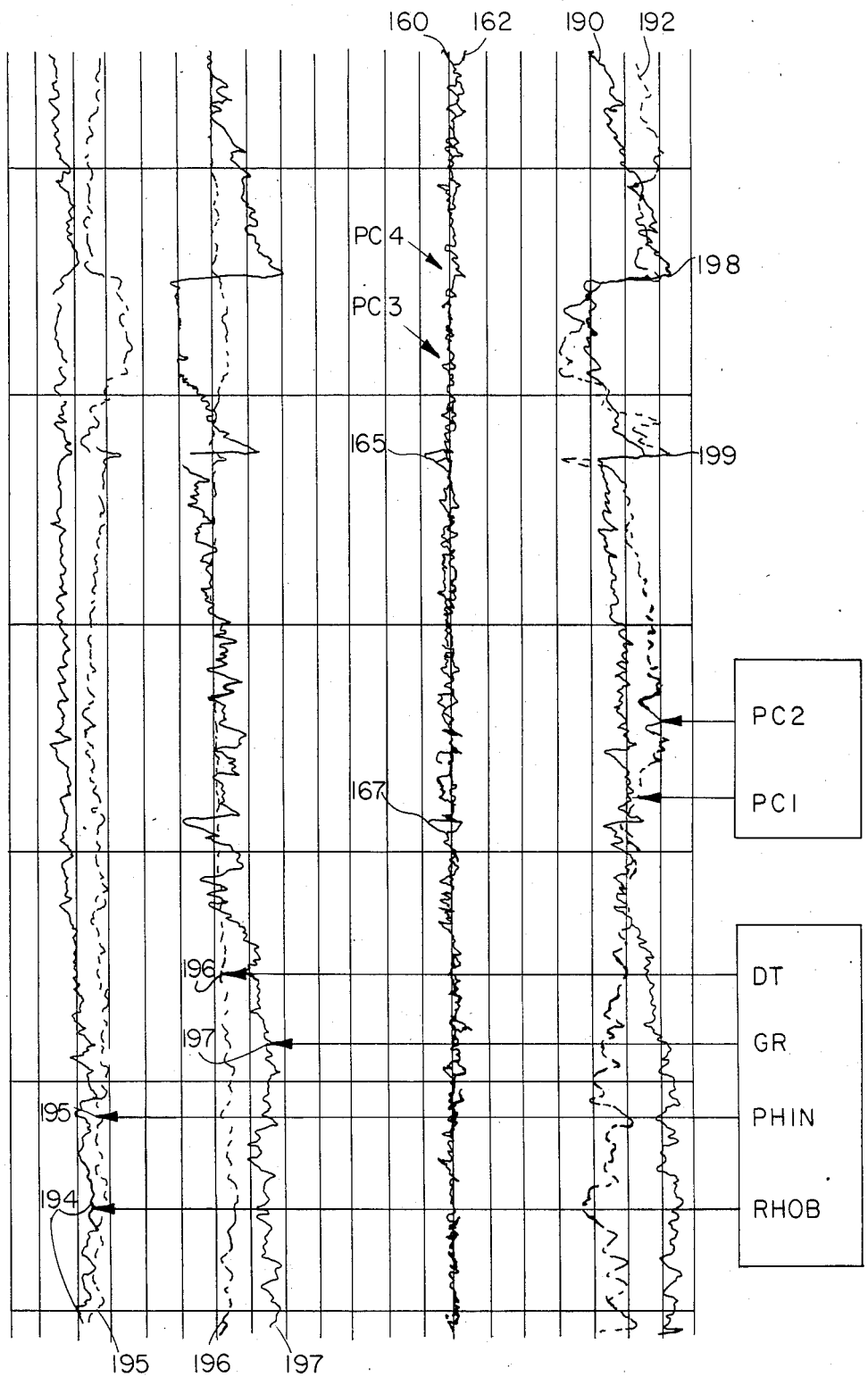
FIG. 7 shows four measurement logs and four synthetic logs representative of the main components of the measurement logs in a borehole interval.

FIG. 7 represents a plot of two logs 160 and 162 corresponding to the third and fourth main components of the scatter considered as a function of the depth of the interval from which the measurements are taken. It is noted that the variations of these two curves are of small amplitude and do not exhibit salient characteristics. Their general form is related to a noise, which reflects well the notion already expressed whereby the information content of each main component decreases in the order of decreasing inertia.

On the other hand, the observation of projections such as 165 and 167 in the logs of the third and fourth main components is capable of providing valuable information either on the presence of factors having a particular geological significance but having no influence on certain measurements, or because, for example, they denote errors on one of the measurements.

Except for these anomalies, the elimination of the main components of secondary order corresponds to a filtering operation, which explains why the rest of the processing in a space with dimensions reduced by the selection of certain main components can furnish results of good quality.

Another means of checking to what extent the selection of a limited number of main components is justified consists in imposing an inverse coordinate change on the points of the scatter from the space of reduced dimensions in order to restore them in the space of the measurements actually carried out and reconstitute the logs from each of the components of the points thus restored. It is often observed that it is sufficient to conserve two main components out of six from the measurements made in the considered interval to obtain excellent correspondence between the original logs and the logs so reconstituted.

FIG. 7 illustrates the curves 190 and 192 corresponding respectively to the plotting of the values of the first and second main components PC$_1$ and PC$_2$ of the points of the scatter obtained in step 86 of FIG. 4.

In FIG. 7 are also shown four curves, respectively 194, 195, 196 and 197, corresponding to the logs of density RHOB, neutron porosity PHIN, transit time DT (acoustic) and GR (natural gamma radiation). These logs make it possible to note a rather clear correspondence between the measurement logs and the PC logs, for example at the transition levels indicated by the references 198 and 199.

The analysis of the scatter in the reduced space of the main components is continued by the determination of clusters within this scatter. These clusters are made up of regions of the space containing a relatively high density of points separated from other similar regions by regions in which the density of points is relatively low.

Figure 8:
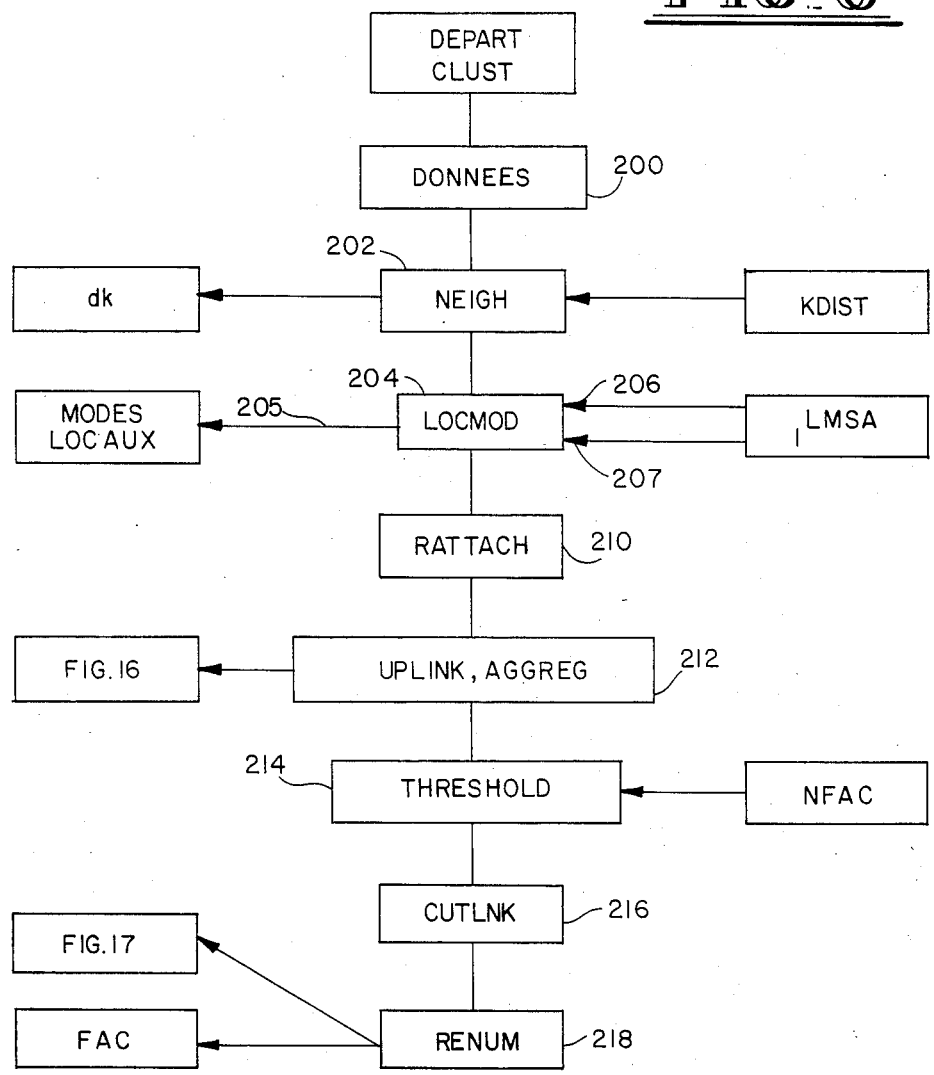
FIG. 8 is a schematic flowchart of processing operations making it possible to distinguish, in the borehole interval, zones relative to predetermined classes.

FIG. 8 represents a flow chart of this phase of analysis. It illustrates the different processing operations which we will now review and which can be carried out by means of data processing equipment programmed for this purpose. It covers substantially the operations described by the steps 88 to 92 of FIG. 4.

The data corresponding to the scatter may be stored in step 200. For each point of the scatter, we determined the closest Kth neighbor in the space of the selected main components step 202 NEIGH.

Figure 9:
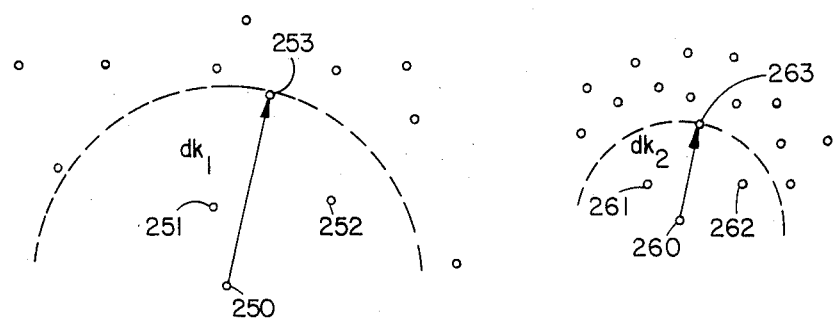
FIG. 9 illustrates the application of the operation of the diagram of FIG. 8.

This operation corresponds, considering a number K=3 of neighboring points, to determining from points such as 250 and 260 (FIG. 9) the radius dk$_1$ of the hypersphere which contains the three points 251, 252 and 253 nearest the point 250 and, for the point 260, the radius dk$_2$ which contains the three points 261, 262 and 263 nearest the point 260. This proximity is expressed by Euclidean distance measurements in the considered space.

For a given number of neighboring points K, the inverse of the distances dk$_1$, dk$_2$ represents a measurement of the local density of the points of the scatter around the point 250, 260 considered.

The input data for the step NEIGH 202 are thus the number K and the PC logs selected for the representation of the scatter. The output of this phase is a number dk for each point of the scatter.

The next operation in step 204 is designed to determine local modes (output 205) which correspond to points of maximum density in the scatter according to an analysis of the values dk. This analysis is performed in one and/or the other of the two spaces. The first space is the depth. All the values dk are scanned according to the level of the associated points to determine whether, in a given window or section of depth I around a level, no other level has a lower index dk. A level fulfilling such a condition is then considered to be the local depth mode. The indication of the width of the section of depth I is symbolized as being transmitted on an output 207 of the step LOCMOD 204.

The second space is that of the main components where the considered scatter is defined. We determine all the points of which the nearest K points are assigned a higher dk value. A second set of local modes is thus obtained.

For the rest of the operations, we select local modes constituting the output of this step 204 under the control of a step 206 LMSA corresponding to a local mode search algorithm according to one of the following procedures:

1. (BATH): exclusive use of only local modes coming from the analysis of depth; or
2. (DELF): only local modes coming from spatial analysis;
3. (BAID): use is made of only the local modes common to the two sets considered (intersection of two sets);
4. (BAUD): all local modes determined are used (union of sets of local modes determined in depth and in space).

Each of the local modes thus selected is representative of a cluster whose density at this point has a maximum value or at least one which is high locally. By an operation represented by block 210 we attach each of the points of the scatter to the local modes to which it is closest on the basis of its Euclidean distance in the space of the scatter. The value of this attachment stage will become apparent later.

Its main effect is to allow a compression of data thanks to which the initial scattering of points is represented only by the local modes thus selected. On the basis of this sparse scatter, it is possible to carry out a certain number of operations of an already known type in the interpretation of log data, for example analyses of characteristics of the formation which make it possible, with a considerably reduced calculation volume, to obtain precise results.

After the attachment step 210, we proceed with an operation for connecting and grouping segments (UPLINK, AGGREG) in step 212 which can result in the establishment of a dendrogram. We consider (FIG. 10) all the local modes selected after the phase 204 and we look for the two local modes 300 and 302 whose Euclidean distance is the smallest in the space of the PC logs of a considered scatter. The segment thus determined is oriented in the direction of the mode whose index dk is minimum (maximum density). This vector is thus oriented in the direction of increasing densities and is characterized, for the search for new segments, only by its end 302. Its origin is no longer considered in the following search.

We then search for the segment of minimum length immediately following, made up here of the points 304 and 306 oriented in that order. Then we determine the smallest segment remaining in this space after the elimination of the origin points 300 and 304 which, in this example, is the segment 306, 302 leading to the elimination of the point 306. The process is continued in this manner until all the points of the scatter of local modes have been grouped by segments whose length will increase as we progress in the scatter.

The end of the last segment thus selected corresponds to the minimum index dk for all the considered local modes. In addition, it may be noted that the last r segments selected during this process have lengths greater than those of the previously determined segments. They moreover correspond to high densities in all the densities of the local modes considered. Thus, the local modes which are at the ends of these r segments of maximum distance have a set of characteristics which, on the whole, are the most mutually dissimilar among all the local modes considered. It is thus valid to select the r ends of these segments as terminal local modes representative of groups of distinct characteristics defining a class corresponding to a litho-facies and with which are attached a plurality of levels whose measurements reflect similar if not identical characteristics.

The method of grouping the local modes just described is characterized by the name of hierarchical single link up-hill, conglomerate clustering. It makes it possible to represent the distances between the local modes analyzed in the form of a tree structure called a dendogram from which a selection of certain of these modes, called terminals, can be made in accordance with a minimum distance threshold.

On the basis of this selection of terminal modes, it is possible to attach to each of these all the other local modes which are associated with them by links or segments, but which were assigned a lower density value (higher dk). It is also possible to enter in the same class, for the selected terminal mode, all the levels which were attached in step 210 to each of the local modes associated with this terminal mode.

Thus, following this operation, all the levels of the scatter analyzed are classified in as many classes as there are terminal modes. Each of these classes can be characterized by a number or index attached to this terminal mode, for example, the value of the first main component for each terminal mode. As already indicated, it is possible to establish from this classification a stepped pilot curve in step 93 of FIG. 4. It is sufficient for this purpose to plot, for each level, as a function of depth, the index value of the corresponding class to obtain a stepped curve whose shape provides utilizable information in correspondence with the litho-facies of the formations encountered.

A precise example of the application of the link up-hill clustering technique is set forth below with reference to a scatter of points distributed in a space defined by three main components taken, after corresponding coordinate changing, from measurements carried out on the previously discussed 1200 levels of the borehole.

The local modes have been selected on the basis of a number K =5. The width of the window or section I used for the selection of the local minima in depth is 2. The local mode search algorithm provides a selection of the local modes in the space of the depth and in that of the main components (BAID mode).

The number of local modes adopted according to this algorithm on the 1200 levels is 69.

Figure 10:
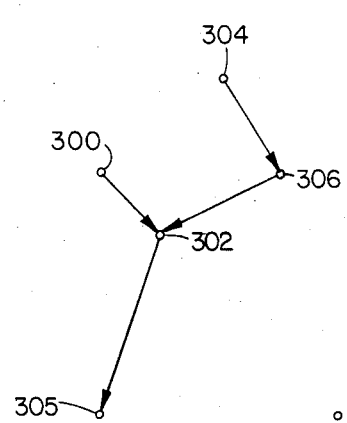
FIG. 10 illustrates explanations concerning the clustering technique for the deprivation of local modes.

During a first phase, the distances of these local modes are selected by determining for each local mode the nearest local mode, the two nearest local modes of the whole constituting the first segment 300, 302 of FIG. 10. In FIG. 16, the 69 segments appear in order of decreasing lengths. The origin and end local modes are identified by their respective appearance numbers from 1 to 69 in the scale of increasing depth and, for the origin modes, also by their respective level number.

In this table and in the one of FIG. 17, produced by means of a computer, the entry E-01 at the end of a numerical value means that this value must be multiplied by $10^{-1}$ to obtain the value of dk.

It is noted that the smallest segment corresponds to the link between mode 4 and mode 5. It appears at the bottom of the table in FIG. 16.

Mode 5 appears in the "segment end" column according to the rule indicated previously, the index dk associated with the origin mode 4 being equal to 0.08910 whereas the dk associated with mode 5 (fifth row from the top in the list of FIG. 16) is equal to 0.07991. Mode 4 is set aside and the analysis is continued with the remaining 68 modes. It shows that the shortest segment succeeding the segment (4, 5) is the segment (12, 17) whose length is 0.122360, the dk of the mode 12 being 0.1168 whereas the dk of the mode 17 located further up in the list is equal of 0.11011. Mode 12 is thus eliminated and the process is continued, the result appearing in the form of the table in FIG. 16.

When this table is scanned from the bottom up, it is noted for example that the mode 17 constitutes the end of two segments respectively (12, 17) and (11, 17) before appearing in a longer segment (17, 15) of which it constitutes the origin, owing to its dk which is higher than the dk of mode 15 (the latter being 0.08585). Mode 17 is then eliminated and does not appear again in the upper part of the table in FIG. 16 when it is scanned from the bottom up.

Mode 15, which forms the end of the segment (17, 15), constitutes the origin of a longer segment (15, 14) whose end mode 14 has a dk of 0.05338 which is smaller than all the dks of all the other local modes considered. This local mode 14 is found again as ends of two segments (18, 24) and (50, 14) at the top of the list in FIG. 16, these latter segments moreover having lengths greater than those of all the segments preceding them.

A graphic representation, called a dendrogram, more formal than that of FIG. 10, can be plotted notably by means of a computer from the data of FIG. 16.

Figure 11A:
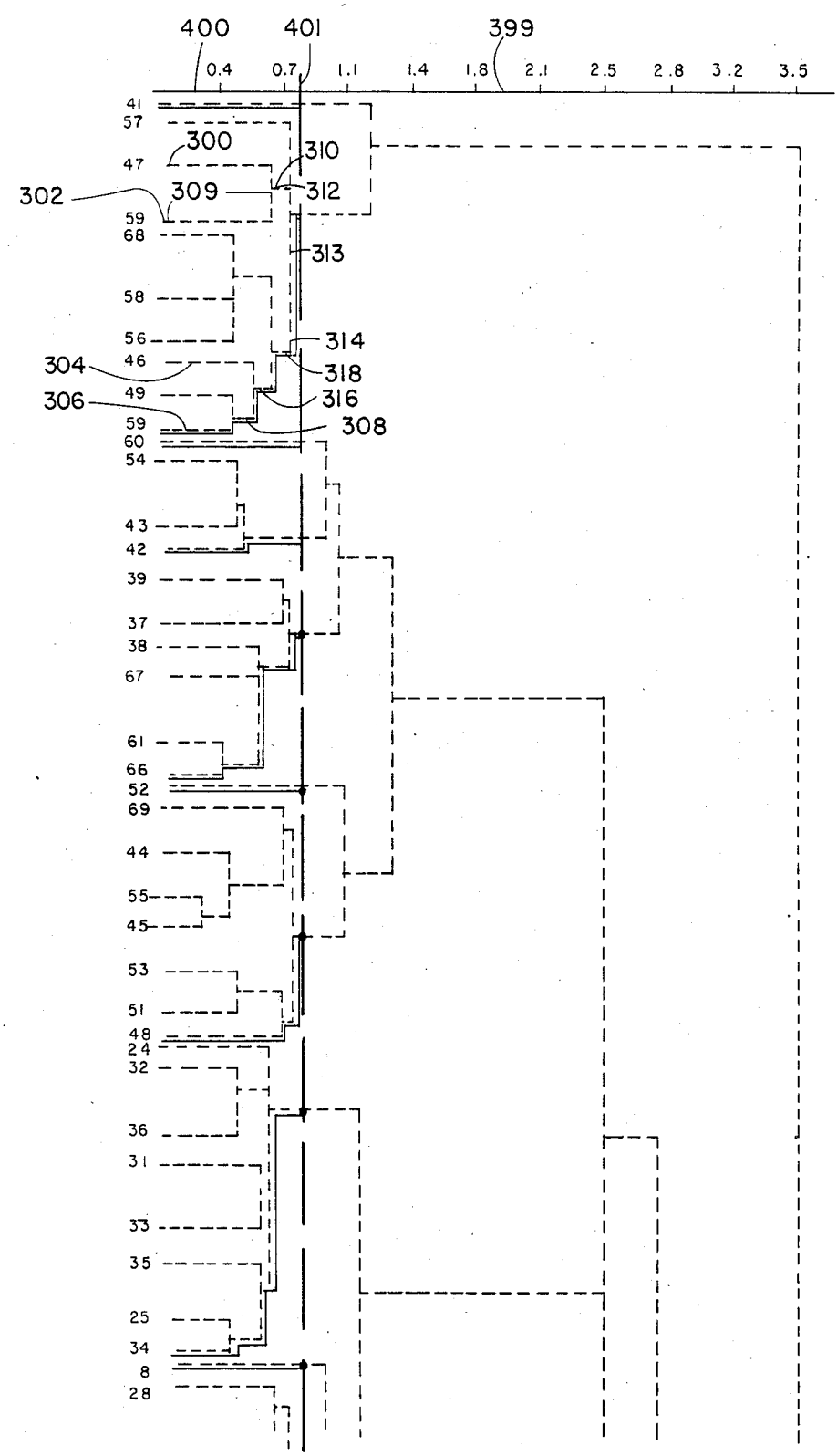
FIGS. 11A and 11B illustrate a dendrogram showing the respective lengths of segments useful in the technique of FIG. 10.
Figure 11B:
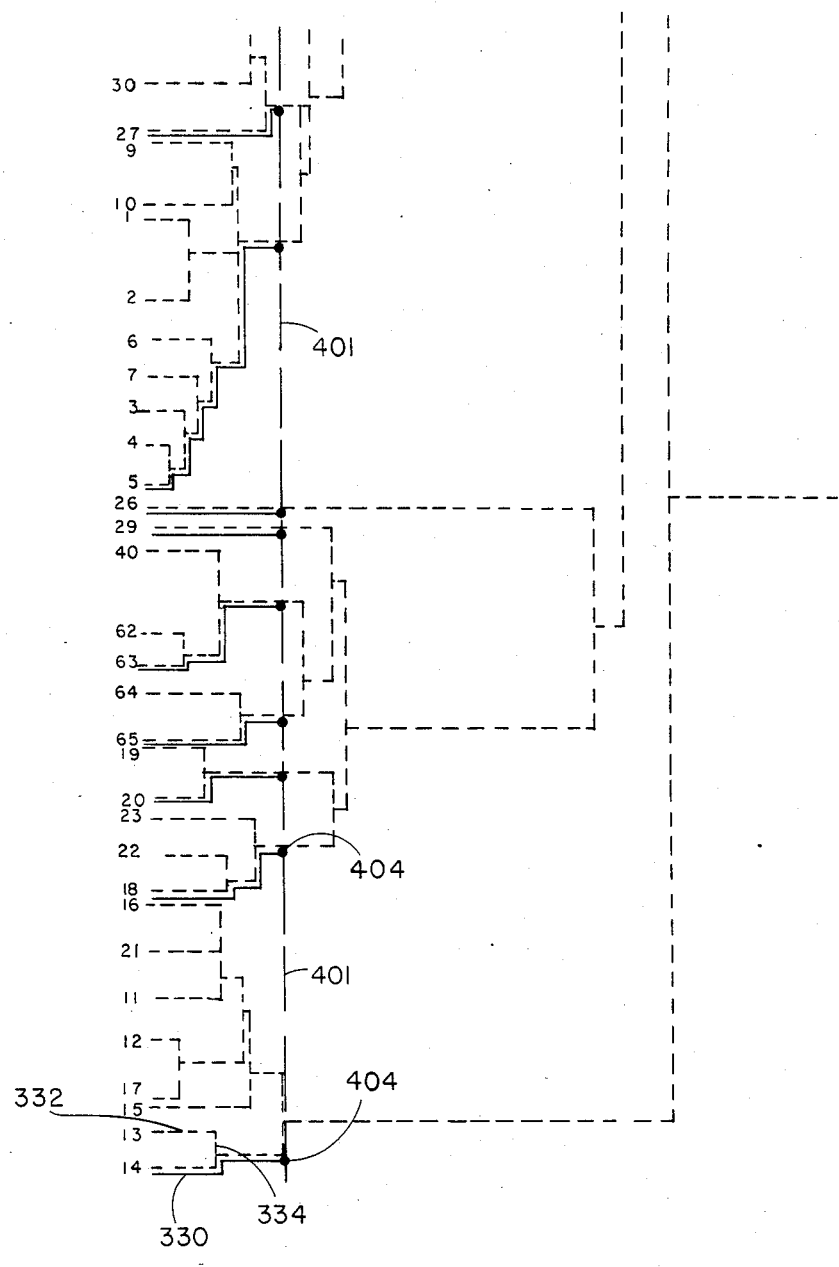

In the diagram of dendrogram of FIG. 11 formed by the juxtaposition from top to bottom of the FIGS. 11A and 11B is placed on the abscissa, at the upper part, a scale of segment length from left to right.

The 69 local modes selected at the origin appear with their corresponding designation on the ordinate in the left-hand column of the diagram. Opposite the designation of the mode 47, for example, at the top of FIG. 11, there is a broken line 300 whose length, parallel to the axis of the abscissas 399, is equal to the distance between this mode 47 and a mode 59 immediately under it which constitutes the end of a respective segment which has been indicated by an arrow 450 in the list of FIG. 16. A parallel broken line 302 with a length equal to the line 300 extends from mode 59. The ends of the lines 300 and 302 are joined parallel to the axis of the ordinates or the vertical axis 400 by a line 309. By convention, in the representation of a segment such as (47, 59), the mode 59 characterizing the end of the segment is placed lower than that characterizing the origin (47) of this segment.

Every segment present in FIG. 16 is represented by a broken line link on the dendrogram of FIG. 11 between the representative points of the origin and end modes of the segment on the line of the ordinates 400. Each of these links includes two lines or series or horizontal lines such as 300 and 302 connected by one or more vertical lines such as 309.

Level 47 does not constitute the end of any segment of FIG. 16. On the other hand, level 59 constitutes the origin of an end segment 50 (arrow 452 in FIG. 16). Mode 50 also constitutes the end of a segment 49, 50 (arrow 454, FIG. 16) which is relatively short (line 306, FIG. 11) and a segment 46, 50 (arrow 456, FIG. 16) whose length is greater and marked by the line 304 itself corresponding to the cumulative length of the lines 306 and 308 of the dendrogram of FIG. 11. Mode 50 is still the end of a segment 56, 50 (arrow 457, FIG. 16, cumulative length of lines 306, 308 and 316) and a segment 57, 50 (arrow 458, FIG. 16, length of lines 306, 308, 316 and 318). The link between the modes 59 and 50 of the segment 59, 50 includes the horizontal lines 302 and 310 whose cumulative length is equal to that of the lines 306, 308, 316 and 318 and represents the length of the segment, and a vertical line 313 joining the ends 312 and 314 of these two horizontal series.

The dendrogram is constructed beginning with the mode 14 at the lower end of the diagram in FIG. 11 (arrow 460, FIG. 16). The density at the mode 14 is maximum (minimum dk) and forms the end of a first segment (13, 14) which is the smallest segment connected to the mode 14. Mode 13 is placed over mode 14 on the axis 400.

The table of FIG. 16 shows that mode 13 is itself not the end of any segment.

The next shortest segment connected to mode 14 is the segment (15, 14) (arrow 462, FIG. 16). Its origin 15 is placed over mode 12 in the dendrogram.

Segment 15 is the end of a segment (17, 15) (arrow 463, FIG. 16) which makes it possible to locate point 17 over segment 15.

This segment 17 is the end of a segment (12, 17) of shorter length (arrow 464, FIG. 16) which makes it possible to locate mode 12 over mode 17 (FIG. 11). Moving up the list in FIG. 16, it is noted (arrow 466) that mode 17 is also the end of a segment (11, 17) which makes it possible to locate mode 11 on the dendrogram of FIG. 11.

FIGS. 16 then shows that mode 11 is the end of a segment (21, 11) (arrow 468) which makes it possible to locate mode 21 in the dendrogram of FIG. 11, and so on.

Such a dendrogram can be plotted under the control of a computer which performs the preceding operations. The local modes are plotted on the axis 400 in the order just described and connected as explained above by means of forks with two branches, such as 330 and 332 for modes 14 and 13. The lengths of these branches each represent the length of the segment 12, 14. Each fork is connected toward the center of its summit 334 to a following fork making it possible to materialize the links between each pair of modes defining a segment and the length of this segment.

It is possible, if a single minimum length is chosen for the segments thus defined in the set of local modes, to select from among them a subassembly of terminal modes. In the present example, a minimum length threshold equal to 0.751 has been chosen whose position is materialized by a broken line 401 with long dashes in FIG. 16. This threshold defines 18 modes which characterize segments whose lengths are greater than it and which constitute so-called terminal modes in the borehole interval thus analyzed. These 18 terminal modes are grouped in the table of FIG. 17 where it has been chosen to classify them in the order of the increasing value of their coordinates of the first main component as they appear in column 360, the coordinates of the other two main components appearing respectively in columns 361 and 364.

It is chosen to consider each of the values of column 360 as characteristic of a class attached to each terminal mode thus detected. These modes are identified by their number in the set of local modes (column 370), in the set of treated levels (column 372) and by a number, called the facies or electro-facies number, in the extreme left-hand column 376, from 1 to 18, in the increasing order of the indices of column 360. Also indicated, in column 378, are the decay values corresponding to each terminal mode.

The threshold selection operation just described is symbolized in the flow chart of FIG. 8 by the block 214 (THRESHOLD) which receives an input instruction NFAC which can be, as just explained, a predetermined distance threshold or which can be a predetermined number of terminal modes.

This threshold selection operation can take on other forms and in particular can be carried out by a more diversified procedure which may lead to a finer selection of the terminal modes to be adopted. For example, one may consider, after having carried out a first selection of terminal modes, the adoption of a second threshold lower than the first, which is applied selectively only to one or several segments attached to these terminal modes.

Referring to the dendrogram of FIG. 11, the line 401 parallel to the axis of the modes 400 and intersecting the axis of the abscissas at the point 1.751 defines the threshold mentioned with reference to FIG. 16. In the dendrogram, all the designation of local modes selected as terminals from this threshold value have been circled.

Each of these modes is connected by a double line at the point of intersection of the threshold line 401 with the corresponding distance fork. Each of the intersection points such as 404 between the threshold line 401 and the horizontal branches of the forks of the dendrogram is connected by such a double line to the local mode occupying the lowest position among all the local modes connected to this intersection point 404. This observation reflects the fact that the segments have, by hypothesis, been oriented by placing their end modes (minimum dk) toward the bottom of the diagram.

Referring to FIG. 8, the phase for the application of the threshold 401 in step 214 is followed by a phase for connecting each of the local modes not used to a corresponding terminal mode. Each phase in step 216 CUTLNK is illustrated by the observation of the dendrogram in FIG. 11. To each terminal mode corresponding to an intersection point 404 are attached the other local modes connected to this point 404. They occupy an immediately higher position in the dendrogram. Thus, to the hyperterminal mode 14 (lower end of dendrogram) are attached the local modes 12, 15, 17, 12, 11, 21 and 16. To the terminal mode 18 are attached the local modes 22 and 23, and so on. By this attachment, we assimilate to a terminal mode, for the classification within the same electro-facies, all the local modes whose distance from this terminal mode is smaller than the given threshold, i.e. which do not reflect a dissimilarity considered sufficient in relation to this terminal mode to be regarded as possible characteristics of a distinct particular facies.

As the line 401 is approached to the axis 400 toward the left in the dendrogram, increasingly greater refinement is obtained in the determination of the terminal modes and of the associated facies.

It is moreover understandable that it is possible, depending on external considerations based upon additional observations, to select terminal modes not from a single threshold but from several thresholds, for example as a function of certain decay index values or main component values, etc.

It is moreover obvious that the selection thus made depends on weighting factors or normalization factors which may have been assigned to the logs used in the measurement space in order to transpose them into the space of the main components. As explained above, the attachment phase 216, FIG. 8, is followed by a phase 218 for classifying the terminal modes according to an index value defining each class attached to each terminal mode.

In the table of FIG. 17 are shown, in column 363, the number of local modes attached to each terminal mode 1 to 18.

Figure 15:
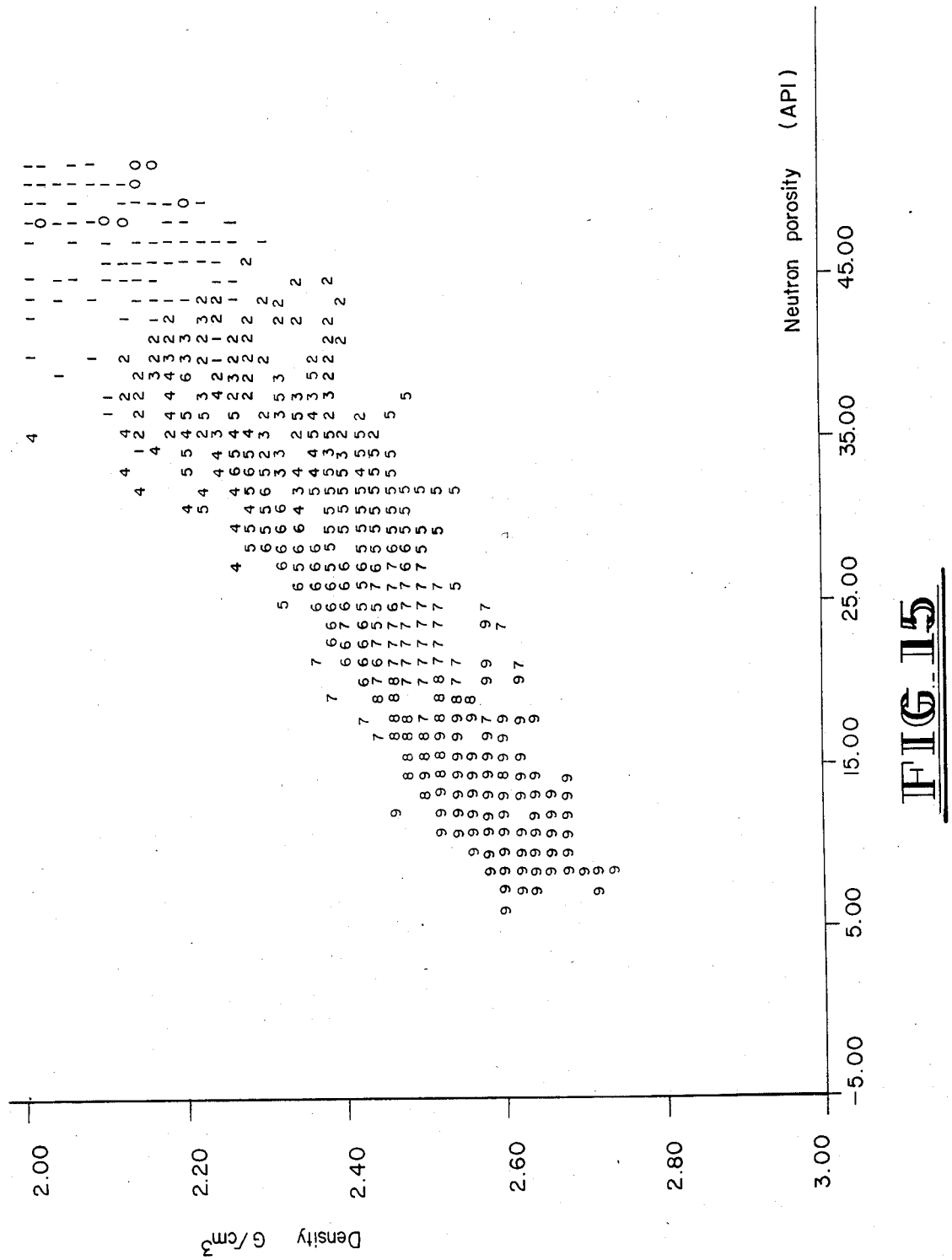
FIG. 15 represents a scattering of points in a bidimensional diagram in which are shown the local and terminal modes resulting from the analysis of the scattering.

In FIG. 15 is represented a diagram in which the neutron porosity and the density measured at different levels of a borehole interval have been plotted respectively on the abscissa and the ordinate. In this representation, each point of a two-dimensional scatter is represented by a figure between 0 and 9 which corresponds to an identification number of the terminal mode to which it has been attached by the operations described above. A double circle has been placed around the 10 modes determined in this example. A single circle has been placed around the points of the scatter which correspond to local modes selected on the basis of the density analysis previously described. These local modes, like the other points, are attached to the terminal modes 0 to 9. This latter attachment has been made on the basis of an analysis corresponding to the dendrogram of FIG. 11. The other points of the diagram have been attached to the terminal modes through their attachment to the circled local modes.

Each class or electro-facies determined in the borehole interval corresponds to a litho-facies which is designated according to the values of the logs for the points which fall within this class. This designation is hence carried out from knowledge of the overall response to all the logs for each of the most current litho-facies. This is a priori knowledge which can be applied manually by a geological expert or automatically by means of a body of rules using so-called artificial intelligence techniques. These rules constitute applications of deductions similar to those applied by geological experts and are formulated in accordance with their experience. They each make it possible, on the basis of one or more initial observation, to draw conclusions on the presence of a particular litho-facies. These conclusions can be expressed in the form of probabilities. Whether manual or automatic, the designation of the litho-facies can make use of data other than logs. It can also make use of an iteration process to refine the first conclusions.

The result of this designation is that each class designated by a number is made to correspond to a litho-facies; for example: class 1, quartzite; class 2, well-compacted limestone, etc. These conclusions can be fixed in graphic form as a function of depth by means of characteristic diagrams of each facies. The processing machine can be programmed to control a log plotting device according to the diagram corresponding to the lithological designation of each class identified for each group of consecutive levels attached to the same class. The stepped curve, or pilot curve, of FIG. 5 may or may not, depending on the requirements of the end user, be produced on the recording.

Figure 12A:
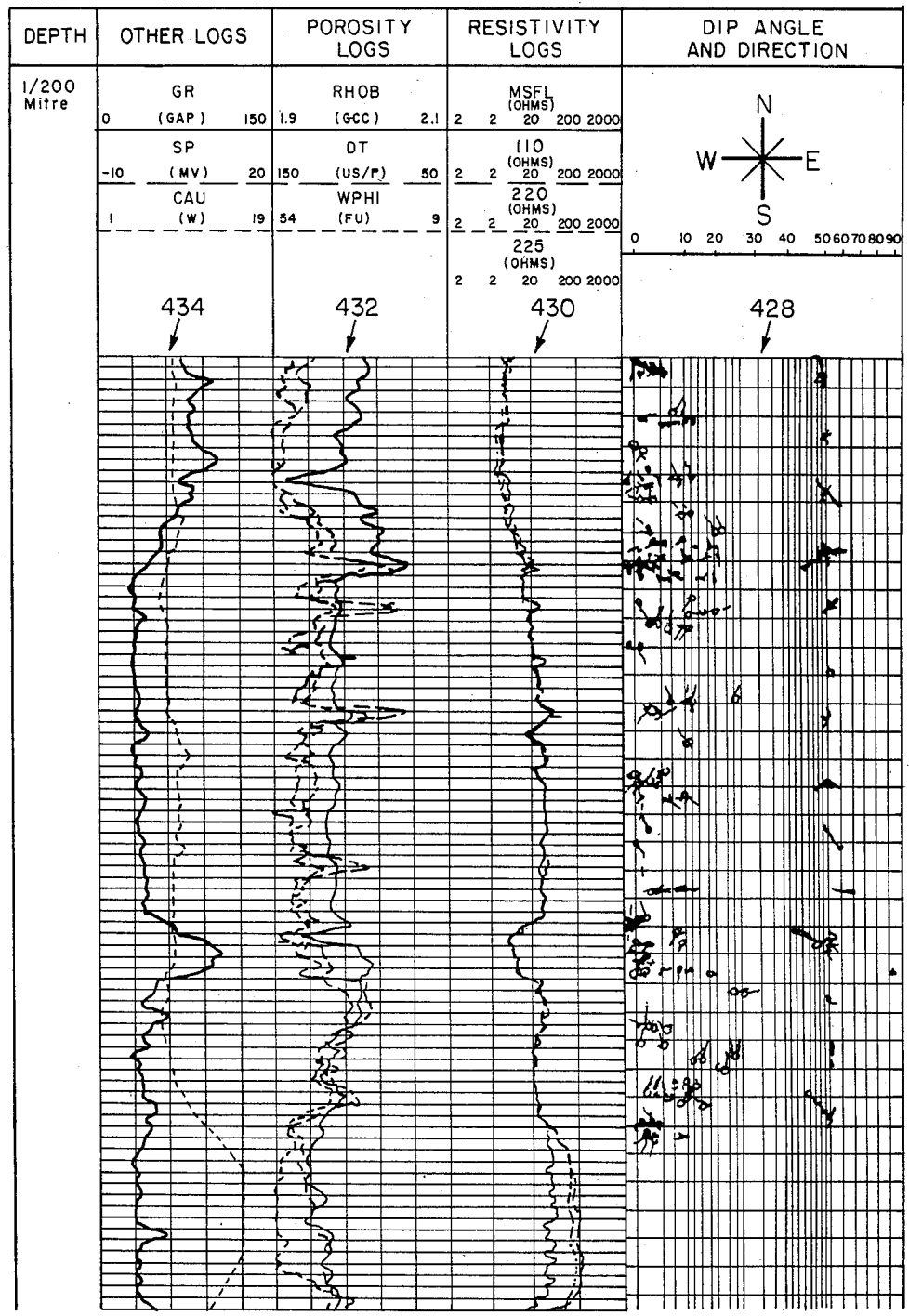
FIGS. 12A and 12B, are a representation of electrofacies as a function of depth along with other indications and representations characteristic of the subsoil formations traversed by the borehole.
Figure 12B:
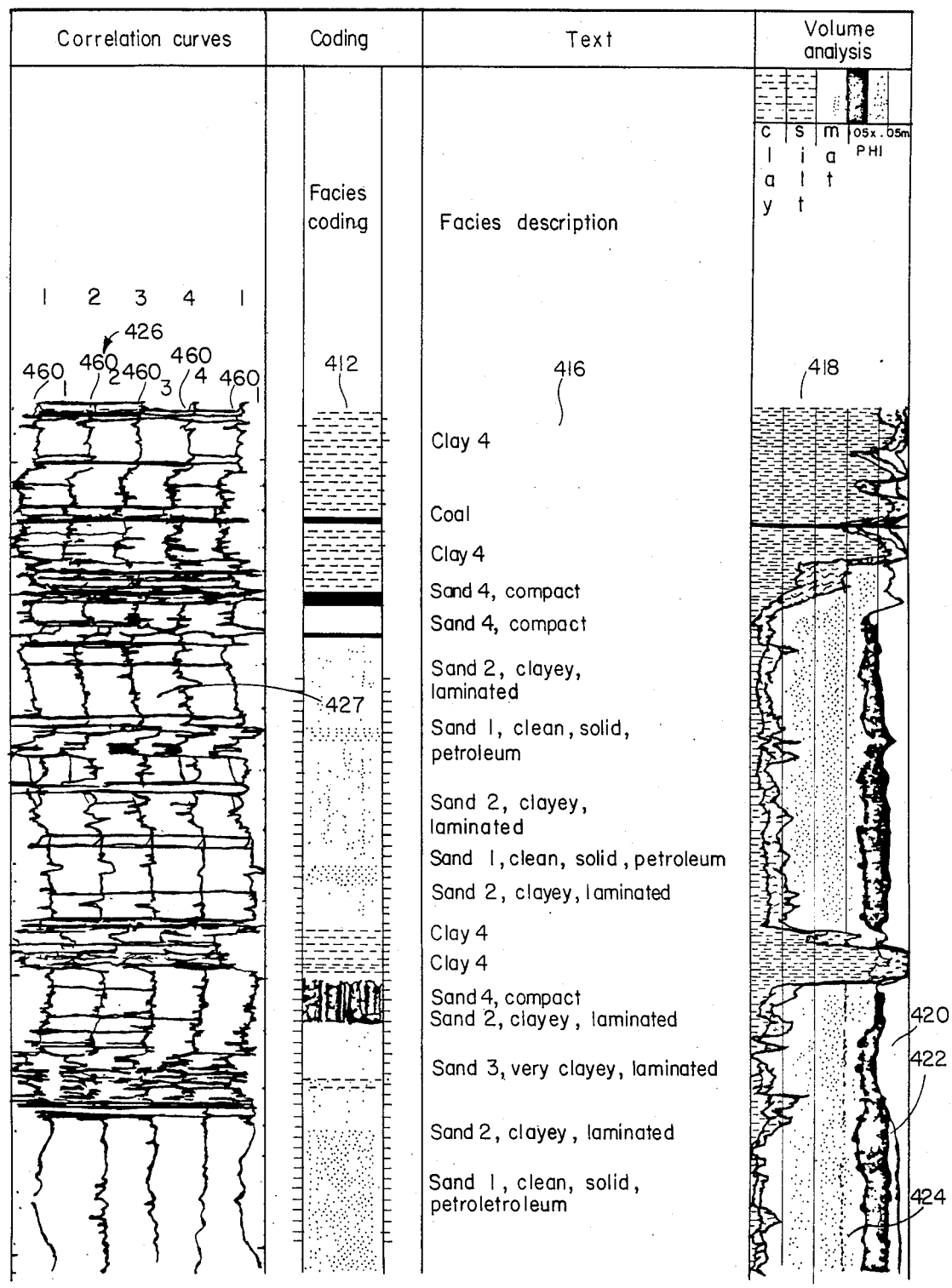

Such a recording of the results of the method appears in FIG. 12 for a borehole interval in which are found more or less clay sands containing petroleum and two thin coal seams.

The facies appear in column 412 and are accompanied by a literal description printed automatically in an adjacent column 416.

To the right of these indications concerning the lithofacies are shown (column 418) the results of a formation evaluation analysis giving in percent the total porosity PHI, the percentage of water in the pores (white zones 420), the residual percentage of petroleum in the invaded zone (black zone 422), the volume of matrix rock (mat, zone 424) the nature of which is indicated in 412 and 416, and the clay and silt volumes.

To the left of column 412 appear the results of dipmeter measurements HDT with (column 426) the four resistivity curves coming from four pads (curve 1 is repeated) and the transverse junction lines 427, or correlation lines, furnished by correlation processing of the GEODIP type as described in the French patent already cited.

The dip angle and direction indications coming from dipmeter measurements are indicated by the arrows in diagram 428. Finally, the left-hand columns in the diagram give the different logs with the respective codes (solid lines: micro SFL; long dashes: induction; short dashes: deep lateral log; dots: surface lateral log). Column 430 shows the resistivity logs. Column 432 shows the porosity logs: gamma (RHOB), sonic (DT) and neutron (NPHI). Column 434 shows the gamma ray (GR) and spontaneous potential (SP) logs.

Using only the local modes after the data compression phases described earlier and their associated log value, it is possible advantageously to interpret the log data over a formation interval with excellent accuracy, while considerably reducing the amount of processing necessary for this purpose. Thus, in the previous example, instead of calculating the parameters of the formation derived from interpretation by means of 1200 levels, the 69 local modes selected are used to plot a formation evaluation diagram with a shape similar to that of column 418 in FIG. 12.

The method just described of course has many variants. In particular, it can integrate into the analysis additional measurements such as obtained by means of a dipmeter of the type described in U.S. Pat. No. 4,251,773. Such a dipmeter is equipped with four pads each provided with means for measuring the resistivity of the zones of the well wall with which they are brought into contact so as to obtain four series of measurements which are a function of the depth of the tool in the well.

The measurements furnished by the dipmetering tools are much denser in depth than those used for other logs. The latter are in fact sampled about every 15 cm whereas the sampling of dipmeter measurements can be carried out every 0.25 or 0.5 cm. Consequently, to make the vertical resolutions of the dipmeter measurements compatible with those of other logs, the following procedure may be used. At each dipmeter sampling level, the resistivity measurements carried out by the four pads are combined to obtain a single value for this level, notably the average value of the four measurements. The resistivity log thus obtained is then transformed to change the sample density to one sample every 15 cm by a moving average technique. For this purpose, with each level $H_i$ for which samples of the other logs or standard logs of columns 430 to 434 of FIG. 12 have been obtained, is associated a resistivity value $R_i$ obtained by calculating the average of the samples of the resistivity log coming from the dipmeter over an interval of 90 cm framing this level $H_i$.

One then calculates a resistivity value of the dipmeter associated with the next level $H_i+15$ in the sampling scale of the standard logs. One thus obtains another resistivity value $R_i+15$ coming from the dipmeter. The procedure is reiterated for all the explored borehole interval levels $H_1$ to $H_n$. The new resistivity log obtained can then be correlated in depth with one of the resistivity logs coming from measurements other than those furnished by the dipmeter, for example the values furnished by conventional resistivity measurements or laterolog measurements, or from induction tools. This depth correlation operation can be carried out using the conventional techniques already mentioned above. It allows the correlation in depth of the measurements coming from the dipmeter in relation to other measurements.

From this correlation, according to one embodiment, one can determine one or several synthetic logs sampled every 15 cm from respective characteristics taken from the measurements coming from the dipmeter. These characteristics can, for example, include the frequency of certain characteristics of measurements coming from each pad, for example the local peaks of these measurements, or the variance of the conductance measurement over a reference depth interval, or the average thickness of the strata shown by the dipmeter over this interval, or the number of correlation lines derived from the correlation processing of the curves obtained by the GEODIP method already mentioned above within this reference depth interval.

The snythetic logs are obtained by a moving average technique in which, after in-depth correlation of the raw measurements, we determine for each sampling level of the other logs, the average value of the chosen characteristic (variance, correlation density, etc.) over a depth interval of 90 cm centered on the chosen level.

The physical characteristics to which synthetic logs are sensitive depend on the characteristic chosen for constructing each one of them. These synthetic logs are advantageously used in conjunction with other logs in the analysis leading to the determination of the electro-facies mentioned earlier.

The advantage of using dipmeter measurements in an electro-facies analysis is that these measurements are very sensitive to the structure of the formations encountered. It is thus possible to improve, by the use of these measurements, the information available on the transition levels between two different facies.

It is possible to refine the determination of the transition between the electro-facies determined in accordance with the procedure just described, for example after having plotted the pilot curve of FIG. 5, by means of a parallel representation of the results of a GEODIP correlation between the curves.

In FIG. 12 has been represented a network of four curves $460_1$ to $460_4$ coming from such a correlation process. The comparison of the results of dipmeter measurements with the products of the correlation which lead to the establishment of a classification of the measurement levels and to a segmentation of the borehole into zones can be accomplished through an iterative procedure. Thanks to dipmeter information, it is possible to modify the cutoff criteria after the clustering operation (THRESHOLD operation of step 214, FIG. 8) in order to obtain adequate matching between the transitions between classes such as they appear for example in the stepped curve FAC (curve 100, FIG. 5) and the structural indications coming from the dipmeter. The points of the curves 460 which have been correlated after GEODIP processing are connected by transverse lines such as 427. A verification is made of the correspondence between these lines and the transition depths between the different transitions of the litho-facies log 412. When a discrepancy is noted between the position in depth of a series of levels correlated between each other in the GEODIP representation and a neighboring transition between two litho-facies, the position of the latter is modified so as to make it match with the indication furnished by the GEODIP curve. This makes it possible to apply to the search for electro-facies or their positioning the contents of the dipmeter measurements in terms of structural information.

The results of the comparison between the curves derived from the dipmeter and the results of the classification obtained after the processing operations described above can thus be used in an iterative manner to repeat this analysis procedure and notably to modify the rules leading to the selection of the terminal modes in order to refine the choice of the number of electro-facies and the criteria used for defining them.

Such an iterative process can also make it possible not only to specify the limits between classes corresponding to different electro-facies but also to proceed with a fine analysis of the litho-facies within a class previously determined during a first relatively rough analysis phase.

In this respect, the termination of the transition levels between electro-facies in the second phase of the process during which are added the levels not used in the first analysis phase of the measurements can be influenced by such data.

The procedures according to the invention also offer the significant advantage of being useful within the framework of a given well as well as that of an oil field comprising several wells.

According to a particular embodiment of the present invention, instead of considering a scatter of points corresponding to only the measurements carried out in a given well, we consider a scatter of points corresponding to all the measurements in several wells. This scatter is analyzed according to the techniques mentioned above for the detection of clusters in the respective hyper-space and the determination of the characteristic logic modes of each of these clusters, the other points of the scatter being attached to these local modes.

As in the case of a single well, it is possible, on the basis of the local modes thus determined, to carry out a formation evaluation interpretation according to the techniques already mentioned under the names of SARABAND, or GLOBAL. It is noted, as previously, that the results of the analysis carried out on a limited number of levels in each well, selected according to the method just indicated, are as good from the practical standpoint as the results coming from an application of these techniques to all the measured levels of the well.

It is moreover possible to determine, on a field-wide scale, a series of terminal modes from which associated classes can be defined. Analysis of the correspondence of the levels of each well to those different classes make it possible to analyze the litho-facies of each well.

According to a variant of that embodiment, in the case of a field in which a certain number of wells, called key wells, have already been carefully analyzed, in particular with the determination of their main components, their local modes and their terminal modes, it is possible to use these results to facilitate the analysis of the facies of the formations encountered by other wells in the same field.

For this purpose, the logs made in a particular well or in several wells, other than the key wells, can be combined with the measurements obtained in the key wells to obtain a multidimensional scatter in which we consider the distances of the points corresponding to the wells to be analyzed in relation to the local modes and to the terminal modes of the key wells. These points are attached to the key local modes and terminal modes to which they are closest on the basis of the comparison of their Euclidean distance from these key points or key modes. This analysis makes it possible to locate, in the well or wells not analyzed, the position of the electro-facies or possibly of only part of the electro-facies encountered in the key wells.

Finally, it is also possible to carry over the measurements from an unknown well into the space of the main components determined during the analysis of one or more key wells.

We shall now describe, as yet another embodiment of the present invention, a method in which the data furnished by the logs are used to obtain as precise an identification as possible of the facies of the formations encountered, taking into account sources of information, other than the logs, which may be available to the analyst.

Figure 14:
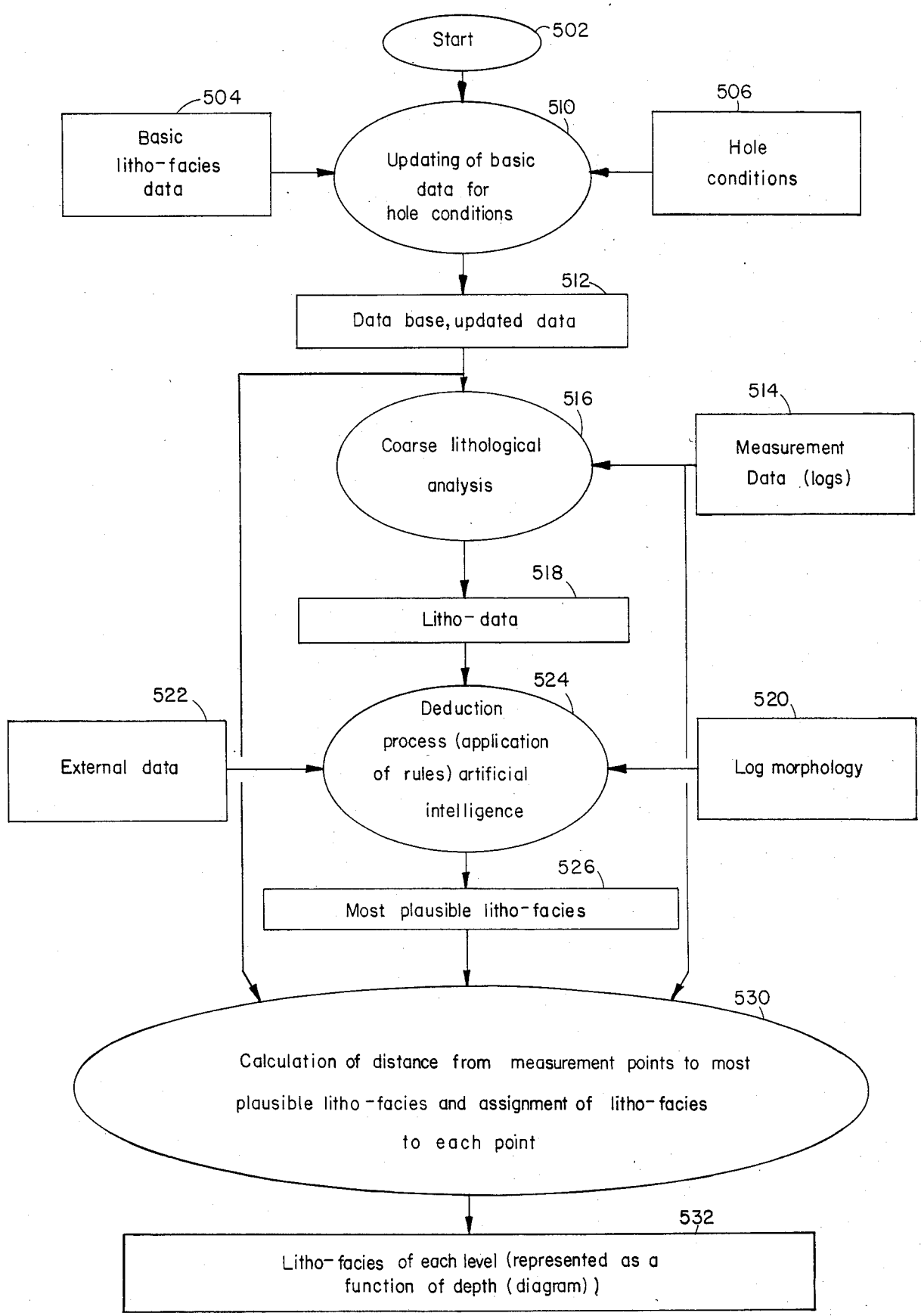
FIG. 14 is a schematic flowchart of the process of FIG. 13.

FIG. 14 summarizes the analysis process. In a first step 502 we consider a data base 504 which characterizes a plurality (e.g. 90) of different litho-facies each for a respective volume in the hyper-space of the logs. This hyper-space can include eight basic dimensions constituted by the eight standard logs mentioned earlier by way of example. These values are advantageously completed by the measurements coming from the dipmeter tools, essentially synthetic logs of the type previously described.

The volume associated with each electro-facies is made up of a set of points corresponding to possible measurement values for this electro-facies. The number of these measurements varies according to the litho-facies considered. The number of points of each volume can be typically between a half dozen and several dozen, and possibly up to 100. The log values characterizing each facies are usually obtained in a reference well with known condition of the borehole, temperature, pressure, etc. The analysis technique presently described is applied to borehole intervals which are previously selected on the basis of a direct observation of the log or from general knowledge of the field. Typically, an interval whose thickness can be between 50 and 200 m is considered. According to the particular hole conditions (block 506) prevailing in this interval (hole diameter, caving) and which can be furnished by a diameter measurement, as well as the specific conditions of the mud filling the borehole (mud resistivity in particular), the data base defining the 90 litho-facies just described is shifted so as to make these measurements applicable to the particular hole conditions in the borehole interval considered. This adaptation is carried out in step 510 for each log according to known correction or shifting procedures and provided as an output in step 512.

The measurements actually obtained in the borehole, inputted in Step 514, are then analyzed according to the output provided in step 512 in order to designate the facies encountered at each measurement level. This designation includes several phases. In particular, it is not always possible to obtain an unambiguous assignment of litho-facies for each level by a direct comparison of the values of each point of the scatter resulting from borehole measurements with the data base for defining the different electro-facies. There are overlaps between the definition volumes for each litho-facies (reference will be made hereafter to these volumes as electro-facies). Consequently, a point of the scatter measured can fall within a zone corresponding to several possible litho-facies.

A relatively rough statistical analysis is thus first carried out step 516 in which is determined, for each measurement point, its distance to four definition points of respective electro-facies which are the closest to it. A definition index is assigned for each of the electro-facies which are closest to the measurement point considered. We assign an index of the plausibility of this point belonging to each of the electro-facies in inverse proportion to the distances determined. We group the results of this statistical analysis at the level of the interval studied to produce a list of plausibility indices for the presence of each of the 90 electro-facies in this interval.

It is also possible to limit this preliminary study to the determination of the number of measurement points falling within each volume of a set of 15 typical volumes determined in advance in the space of the logs.

We thus obtain a rough lithological identification of "litho-data," provided as an output in step 518, which constitutes one of the input information items for the next phase.

This next phase, step 524, applies "artificial intelligence" techniques allowing the automation of relatively complex deductive processes such as those used by experts in a given field of investigation, the field of geology in this case. The deductive process applied here makes use of two other sources of data at steps 520 and 522 respectively: (1) the morphology of the different logs obtained in the analyzed interval, namely plateau (wide, medium, or narrow), ramp (long, medium, short or very short) (examples shown in FIG. 13) and (2) "external" data, namely mineralogy, geological formation, stratigraphy, sedimentology, geography, paleontology (examples shown in FIG. 13). The latter include in particular the region data, notably the geographical location of the borehole which make it possible to deduce the different consequences on formation geology of the data furnished by an analysis of the borehole debris, the description of cores and general geological knowledge which may be available to the analyst in the geological zone in which the investigated interval is located. The regional rules for example take into account certain specific lithological characteristics of a given region. These are of a very general nature and correspond to information published in geological works of general interest.

Artificial intelligence techniques are well known. They apply rules which relate initial data to one or more conclusions. These initial data are obtained from sources as described above. The conclusions are formulated in the form of deductions on the nature of the formations in the analyzed interval, presented in the form of possible characteristics each accompanied by index values representing the plausibility of the presence or absence of this characteristic. Plausibility indices can take on values between $-1$ and $+1$. Positive plausibilities correspond to the probability of the presence of the characteristic or of the litho-facies to which they are related. The negative values correspond to probabilities of absence, this probability increasing as the negative values increase. The plausibility interval $(-0.1, +0.2)$ corresponds to an uncertainty zone.

The types of conclusions furnished in the present example form three categories:
- the best depositional paleo-environment (coastal, lagoonal, etc.);
- the main geological type (biological, evaporitic, carbonated or plutonic);
- a list of the most plausible litho-facies in the interval considered, accompanied by a respective plausibility index (block 526).

This part of the process to provide the needed information at step 520 can be applied by means of a dialog between the processing machine and the user. The machine is programmed to guide the user by a series of questions and to pursue the investigation in accordance with the replies provided by the user. Thus, the program asks the user questions on stratigraphy, sedimentology, mineralogy, and so on (examples shown in FIG. 13). It then asks questions on the structure or the morphology of the different curves, proposing the different possible answers.

In the present illustrative example, there are 400 application rules. Three simple examples of these rules are given below, in connection with each source of information furnished to the program. Many variations on these rules are possible and the process can be evolutionary in nature.

Rule 054

"if, according to the litho-data, the percentage of measurement points falling within the typical volume No. 13 (corresponding approximately to measurement values encountered in gypsum) is greater than 5%,
then the plausibility that the depositional paleo-environment of the zone will be lagoonal is 0.7, pelagic $-1$, lacustrine 0.2, arid $-0.6$, coastal 0.3 or reefal 0.2."

Rule 295

"if (1) the stratigraphy period is cretaceous and ($-2$) the geological province is the fold of the Zagros range in Iran; then:
(a) this indicates that the depositional paleo-environment of the zone is fluviatile ($-0.6$), lacustrine ($-0.6$), deltaic ($-0.6$), glacial ($-0.8$), and so forth
(b) this indicates that the main lithological type of the zone is detritic ($-0.3$), biological (0.3), evaporitic (0.3) or plutonic ($-0.5$)
(c) this is a minor indication that the geological formation of the zone is not entirely compacted, and
(d) there is a minor indication (0.3) of the presence of petroleum in the zone."

Rule 008

"(1) If there is a plateau in the curve of the gamma radiation of the zone, and
(2) the radioactivity level of the zone is less than 40 API, then thre is a strong indication (0.8) that the zone is a clean zone, i.e. with a low clay content."

FIG. 13 represents very schematically the deductive process applied by these rules which link the three major sources of data to the three categories of conclusions mentioned above, passing through intermediate conclusions on whether or not the formation is compacted, its cleanliness (absence of clay) and the deposit energy.

With reference again to FIG. 14, the list of the most plausible litho-facies the output of which is provided in step 526 makes it possible to proceed with the assignment of each of the points of the interval to the most plausible litho-facies, all the other litho-facies being eliminated.

For each of the measurement points, its distance is calculated to the five closest points of the plausible litho-facies in step 530. The distances thus obtained are weighted by a factor derived from the plausibility of each of these facies in order to assign to the point considered the litho-facies which corresponds to the minimum weighted distance.

This process thus furnishes directly a segmentation of the borehole interval into successive zones each corresponding to a respective facies which is designated directly and outputted at step 532.

Of course, in the preceding example, it is possible to refine each zone, notably by making use of data coming from dipmeter measurements.

The addition of external data and the morphology of the curves thus makes it possible to obtain an indication of certain genetic characteristics of the facies, i.e. other than petrographic or petrophysical. It also clears up any ambiguities in the determination of the litho-facies on the basis of log data alone.

An example is given below of conclusions obtained after the process just described for a formation interval called "Zone 1". All the negative plausibility values and those lower than a certain threshold have been eliminated.

(a) The best depositional paleo-environment for "Zone 1" is:
coastal 0.978
lagoonal 0.837
neritic 0.549

(b) the main lithological type for the zone is:
biological 0.988
evaporitic 0.571.

(c) The most plausible litho-facies for "Zone 1" are:
well-cemented dolomitic limestone 0.967
well-cemented dolomite 0.959
moderately cemented dolomitic limestone 0.956
moderately cemented dolomite 0.956
well-cemented limestone 0.941
moderately cemented limestone 0.914
anhydrous dolomite 0.910
sandy limestone 0.958
clayey limestone 0.856
solid shale 0.816
siliceous limestone 0.807
silex 0.791
gypsum 0.766
weakly cemented dolomitic limestone 0.766
moderately compacted or cemented sandstone 0.756
siderite ($FeCO_3$) 0.743
salt 0.730
cellular dolomite 0.711
oil shale 0.848.

In describing the invention, reference has been made to its preferred embodiment. However, those skilled in the art and familiar with the disclosure of the invention may recognize additions, deletions, substitutions or other modifications which would fall within the purview of the invention as defined in the appended claims.

We claim:

1. A method of predicting the facies of a geological formation traversed by a borehole comprising:
    (a) moving a sonde through a plurality of predetermined levels in a borehole traversing a geological formation and recording the log measurements taken by the sonde at each of the predetermined levels;
    (b) selecting the recorded log measurements which are stable over consecutive levels;
    (c) assigning the selected log measurements to points in an n dimensional space in which n is equal to the number of log measurements recorded at each of the levels;
    (d) selecting pairs of modes which are furthest apart from each other in the n dimensional space, each of the modes corresponding to a point of maximum density of the points in the n dimensional space;
    (e) assigning each point in the n dimensional space to the respective closest mode, thereby defining classes of log measurements, each class characterizing an electro-facie;
    (f) correlating the electro-facies with the facies traversed by the borehole; and
    (g) comparing a recorded log measurement not selected in step (b) to the classes of log measurements to predict the facie of the geological formation traversed by the borehole associated with the level of the log measurement not selected in step (b).

2. The method of claim 1 additionally comprising producing a recording of the electro-facies of the geological formation traversed by the borehole.

3. The method of claim 1 wherein the number of dimensions in the n dimensional space is reduced by limiting n to the number of recorded log measurements representing the maximum variability of the recorded log measurements in the n dimensional space.

4. The method of claim 3 further comprising defining a line in the n dimensional space for which the distance from each point in the n dimensional space to that line is the smallest and changing the dimensions of the n dimensional space to express the position of that line in the n dimensional space.

5. The method of claim 1 wherein n equals either 1, 2 or 3.

6. The method of claim 1 wherein the number of dimensions in the n dimensional space is reduced by limiting n to the number of recorded log measurements representing at least about 85% of the variability of the recorded log measurements in the n dimensional space.

7. The method of claim 1 wherein each point of maximum density of the points in the n dimensional space is selected by determining an index representing the density of the points in the n dimensional space adjoining each point.

8. The method of claim 7 wherein said index is determined by selecting the hypersphere with the minimum radius, each hypersphere being centered on each point in the n dimensional space and encompassing a predetermined number of nearest neighboring points.

9. The method of claim 7 wherein the modes are selected by selecting pairs of maximum density indices.

10. The method of claim 9 wherein the log measurement not selected in step (b) is assigned to a class by testing to determine whether the log measurement not selected in step (b) belongs to a ramp or a bump.

11. The method of claim 10 wherein said distance is calculated between the point in the n dimensional space corresponding to the log measurement not selected in step (b) and the modes of the classes corresponding to the levels closest in depth to the level of the log measurement not selected in step (b).

12. The method of claim 10 wherein the determination of whether the log measurement not selected in step (b) belongs to a ramp or a bump comprises selecting a maximum distance above which the log measurement not selected in step (b) is determined to belong to a ramp and below which the log measurement not selected in step (b) is determined to belong to a bump.

13. The method of claim 1 additionally comprising assigning the log measurement not selected in step (b) to a class.

14. The method of claim 13 wherein the log measurement not selected in step (b) is tested by calculating the distance between the point in the n dimensional space corresponding to the log measurement not selected in step (b) and the two classes corresponding to the levels closest in depth to the level of the log measurement not selected in step (b).

15. The method of claim 13 wherein each log measurement belonging to a ramp is assigned to one of the two electro-facies immediately adjacent the level of the ramp in depth, the transition between the two electro-facies being a point equidistant in the n dimensional space from the classes corresponding to the levels of each of the respective adjacent levels.

16. The method of claim 13 wherein each log measurement belonging to a bump is assigned either to one of the classes defined in step (f) or, if none of the classes defined in step (f) corresponds to the log measurement belonging to a bump, to a different class.

17. The method of claim 1 wherein the selected log measurements are normalized.

18. The method of claim 1 wherein the recorded log measurements are selected as being stable over consecutive levels on the basis of whether the recorded log measurements remain within a predetermined range over a predetermined number of consecutive levels.

19. The method of claim 1 additionally comprising assigning each class an index number.

20. The method of claim 19 wherein the index number of each class is plotted as a function of the depth of the borehole.

21. The method of claim 1 wherein the number of pairs of modes selected is limited by a threshold number.

22. The method of claim 1 additionally comprising correlating the electro-facies from a selected level to the dipmeter data from that selected level.

23. A method of producing a recording characteristic of the facies of a geological formation traversed by a borehole comprising:
(a) moving a sonde through a plurality of predetermined levels in a borehole traversing a geological formation and recording the log measurements taken by the sonde at each of the predetermined levels;
(b) selecting recorded log measurements which remain within a predetermined range over a predetermined number of consecutive levels;
(c) normalizing the selected log measurements;
(d) assigning the selected log measurements to points in an n dimensional space, n being limited to the number of recorded log measurements representing about 85% of the variability of the recorded log measurements in the n dimensional space;
(e) selecting pairs of modes which are furthest apart from each other in the n dimensional space, each of the modes corresponding to a point of maximum density of the points in the n dimensional space;
(f) assigning each point in the n dimensional space to the respective closest mode to define classes of log measurements, each class characerizing an electro-facies;
(g) correlating the electro-facies with the facies traversed by the borehole;
(h) comparing a recorded log measurement not selected in step (b) to the classes of log measurements to predict the facie of the geological formation traversed by the borehole associated with the level of the log measurement not selected in step (b); and
(i) producing a recording of the electro-facies as a function of the depth of the borehole.

24. Apparatus for producing a recording representing the facies of a geological formation traversed by a borehole comprising:
means movable through a borehole for producing log measurements from a plurality of predetermined levels of the borehole;
means for selecting the log measurements produced by said log measurement producing means which are stable over consecutive levels traversed by said log measurement producing means;
means for normalizing the log measurements produced by said log measurement producing means;
means for assigning the log measurements produced by said log measurement producing means to points in an n dimensional space in which n is equal to the number of log measurements recorded at each of the levels;
means for selecting pairs of modes which are furthest apart from each other in the n dimensional space, each of the modes corresponding to a point of maximum density of the points in the n dimensional space;
means for defining classes of log measurements by assigning each point in the n dimensional space to the respective closest mode selected by said mode selecting means, each of the classes characterizing an electro-facies;
means for correlating the electro-facies with the facies of the geological formation traversed by said log measurement producing means; and
means for producing a recording representing the correlation of the facies of the geological formation traversed by said log measurement producing means to the electro-facies.

* * * * *

UNITED STATES PATENT AND TRADEMARK OFFICE
CERTIFICATE OF CORRECTION

PATENT NO. : 4,646,240

DATED : February 24, 1987

INVENTOR(S) : Oberto Serra et al

It is certified that error appears in the above-identified patent and that said Letters Patent are hereby corrected as shown below:

On the Title Page:

In the heading, the Assignee should appear as follows:

Assignee: Schlumberger Technology Corporation
Houston, Texas.

Signed and Sealed this

Seventeenth Day of November, 1987

Attest:

DONALD J. QUIGG

*Attesting Officer*  *Commissioner of Patents and Trademarks*